US011973946B2

(12) United States Patent
Fukushima et al.

(10) Patent No.: US 11,973,946 B2
(45) Date of Patent: *Apr. 30, 2024

(54) PICTURE ENCODING DEVICE, PICTURE ENCODING METHOD, AND PICTURE ENCODING PROGRAM, AND PICTURE DECODING DEVICE, PICTURE DECODING METHOD, AND PICTURE DECODING PROGRAM

(71) Applicant: Godo Kaisha IP Bridge1, Tokyo (JP)

(72) Inventors: Shigeru Fukushima, Yokohama (JP); Hiroya Nakamura, Yokohama (JP); Toru Kumakura, Yokohama (JP)

(73) Assignee: Godo Kaisha IP Bridge1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,219

(22) Filed: Oct. 18, 2022

(65) Prior Publication Data

US 2023/0042714 A1 Feb. 9, 2023

Related U.S. Application Data

(63) Continuation of application No. 17/197,495, filed on Mar. 10, 2021, now Pat. No. 11,523,114, which is a (Continued)

(30) Foreign Application Priority Data

Apr. 28, 2017 (JP) ................................. 2017-089252

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/176* (2014.11); *H04N 19/186* (2014.11); *H04N 19/50* (2014.11); *H04N 19/96* (2014.11)

(58) Field of Classification Search
CPC .. H04N 19/119; H04N 19/176; H04N 19/186; H04N 19/50; H04N 19/96;
(Continued)

(56) References Cited

U.S. PATENT DOCUMENTS 10,200,719 B2 2/2019 Zhang
11,095,893 B2 8/2021 Hsieh
(Continued)

FOREIGN PATENT DOCUMENTS

CN 100461867 C 2/2009
CN 103583045 A 2/2014
(Continued)

OTHER PUBLICATIONS

Chen, et al., "Algorithm Description of Joint Exploration Test Model 5 (JEM 5)", Joint Video Exploration Tem (JVET) of ITU-T SG 16 WP 3 and ISO/IEC JTC 1/SC 29/WG 11, 5th Meeting, Geneva, CH Jan. 12-20, 2017, 5 pages.

(Continued)

*Primary Examiner* — Dramos Kalapodas
(74) *Attorney, Agent, or Firm* — Shih IP Law Group, PLLC

(57) ABSTRACT

Provided is a picture encoding device that divides a picture into blocks and performs encoding for each of the divided blocks. A primary signal block divider divides a primary signal of the picture into rectangles having a predetermined size, and generates a primary signal block. A secondary signal block divider divides a secondary signal of the picture into rectangles having a predetermined size, and generates a secondary signal block. A primary signal predictor predicts (Continued)

a primary signal, and a secondary signal predictor predicts a secondary signal. The secondary signal predictor can perform inter prediction of predicting a secondary signal from an encoded primary signal, and the inter prediction is restricted based on at least one of a size of the primary signal block and a size of the secondary signal block.

9 Claims, 24 Drawing Sheets

Related U.S. Application Data continuation of application No. 16/665,031, filed on Oct. 28, 2019, now Pat. No. 10,979,710, which is a continuation of application No. PCT/JP2018/011953, filed on Mar. 26, 2018.

(51) Int. Cl.
*H04N 19/186* (2014.01)
*H04N 19/50* (2014.01)
*H04N 19/96* (2014.01)

(58) Field of Classification Search
CPC .. H04N 19/593; H04N 19/105; H04N 19/136; H04N 19/103; H04N 19/157; H04N 19/503; H04N 19/11; H04N 19/196
See application file for complete search history.

(56) References Cited

U.S. PATENT DOCUMENTS

| | | |
|---|---|---|
| 2013/0034157 A1 | 2/2013 | Helle |
| 2013/0034171 A1 | 2/2013 | Winken |
| 2014/0003512 A1* | 1/2014 | Sato .............. H04N 19/11 375/240.12 |
| 2015/0016512 A1 | 1/2015 | Pu |
| 2015/0124865 A1 | 5/2015 | Kim |
| 2015/0326883 A1* | 11/2015 | Rosewarne .......... H04N 19/186 375/240.18 |
| 2016/0050422 A1 | 2/2016 | Rosewarne |
| 2016/0219276 A1 | 7/2016 | Li |
| 2016/0219283 A1 | 7/2016 | Chen |
| 2016/0219298 A1 | 7/2016 | Li |
| 2016/0316229 A1 | 10/2016 | Helle |
| 2017/0070743 A1 | 3/2017 | Zhou |
| 2017/0105014 A1 | 4/2017 | Lee |
| 2018/0295358 A1 | 10/2018 | Sato |
| 2019/0260992 A1 | 8/2019 | Jin |
| 2019/0289332 A1 | 9/2019 | Rosewarne |

FOREIGN PATENT DOCUMENTS

| | | | |
|---|---|---|---|
| CN | 107431815 B * | 3/2021 | ............ H04N 19/119 |
| JP | 2013-090015 A | 5/2013 | |
| JP | 2013-110576 A | 6/2013 | |
| JP | 2016-530775 A | 9/2016 | |
| JP | 2016-539551 A | 12/2016 | |
| WO | 2015005418 A1 | 1/2015 | |
| WO | 2016/155641 A1 | 10/2016 | |
| WO | 2016157924 A1 | 10/2016 | |
| WO | WO-2016155641 A1 * | 10/2016 | ............ H04N 19/105 |
| WO | 2017/008263 A1 | 1/2017 | |

OTHER PUBLICATIONS

K. Kawamura., "AHG5 CU Based Chroma Intra Prediction With Reduced Reference", Apr. 20, 2013, 7 pages, Document: JCTVC-M0412, Joint Collaborative Team on Video Coding (JCT-VC) of ITU-T SG 16 WP 3 and ISO/IEC JTC 1/SC 29/WG 11, 13th Meeting Incheon, KR, Apr. 18-26, 2013.

Extended European Search Report from EP Application No. 18790905.6 mailed Jul. 15, 2020, 11 pages.

Office Action from EP Application No. 18790905.6 dated May 8, 2023, 6 pages.

Office Action from EP Application No. 18 790 905.6 mailed Feb. 26, 2024, 6 pages.

* cited by examiner

FIG.11
DIVISION INTO TWO IN HORIZONTAL DIRECTION
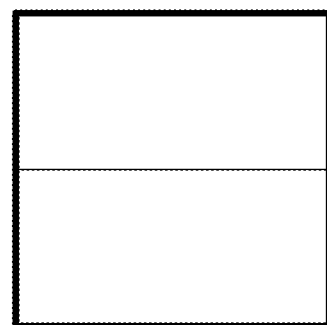
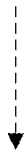
 
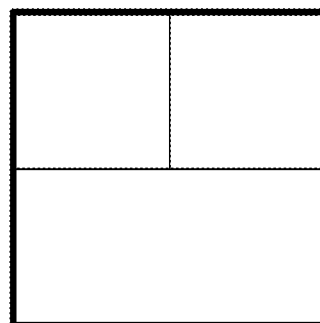 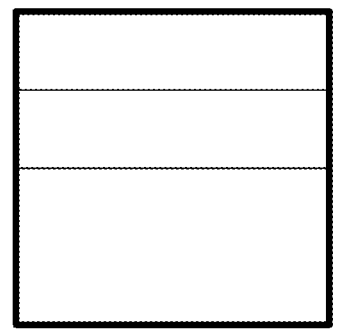
REDIVISION INTO TWO　　REDIVISION INTO TWO
IN VERTICAL DIRECTION　IN HORIZONTAL DIRECTION FIG.13
DIVISION INTO TWO IN VERTICAL DIRECTION
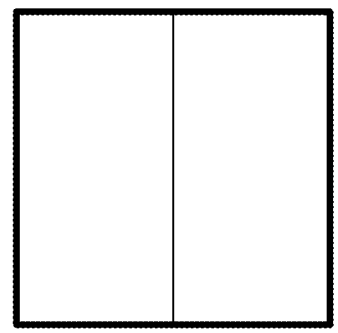
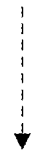
 
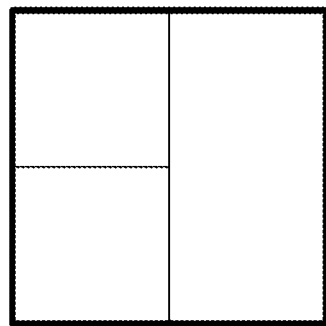 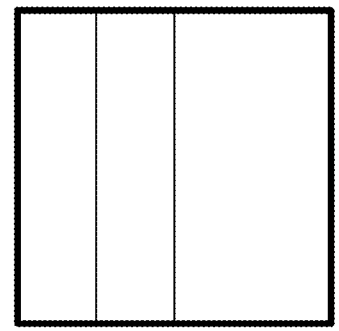
REDIVISION INTO TWO          REDIVISION INTO TWO
IN HORIZONTAL DIRECTION      IN VERTICAL DIRECTION

FIG.14

```
4_division_flag
If(!4_division_flag){
    2_division_flag
    if(2_division_flag && !prev_2_division_flag){
        2_division_direction
    }
}
```

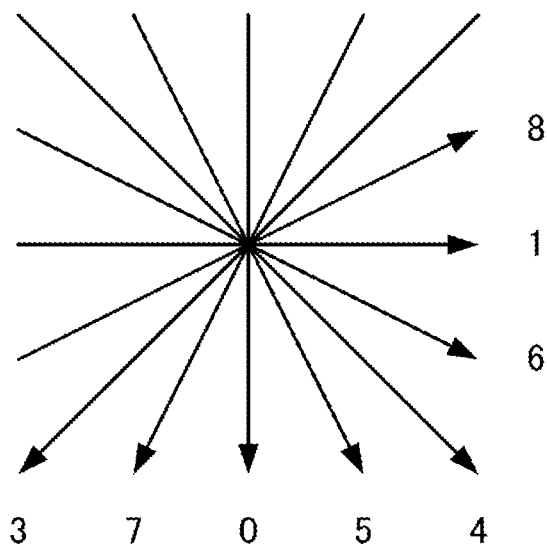
FIG.15A
| MODE NUMBER | PREDICTION DIRECTION |
|---|---|
| 0 | vertical |
| 1 | horizontal |
| 2 | DC |
| 3 | Diagonal down left |
| 4 | Diagonal down right |
| 5 | Vertical right |
| 6 | Horizontal down |
| 7 | Vertical left |
| 8 | Horizontal up |
FIG.15B
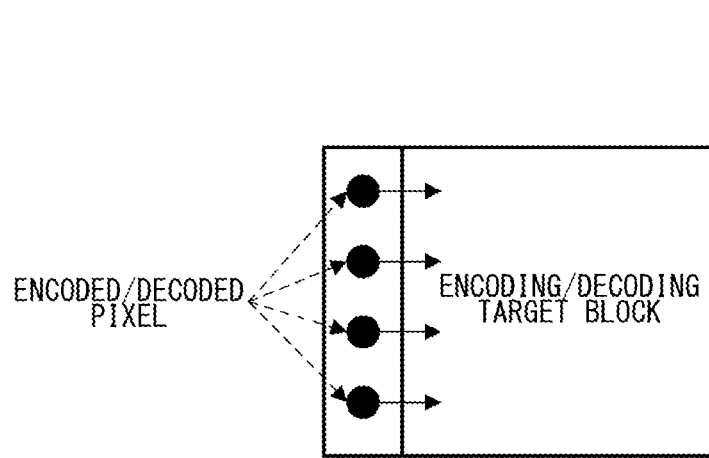
FIG.15C
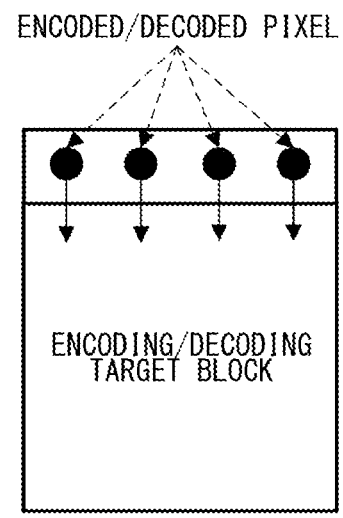
FIG.15D FIG.16
REFERENCE PICTURE
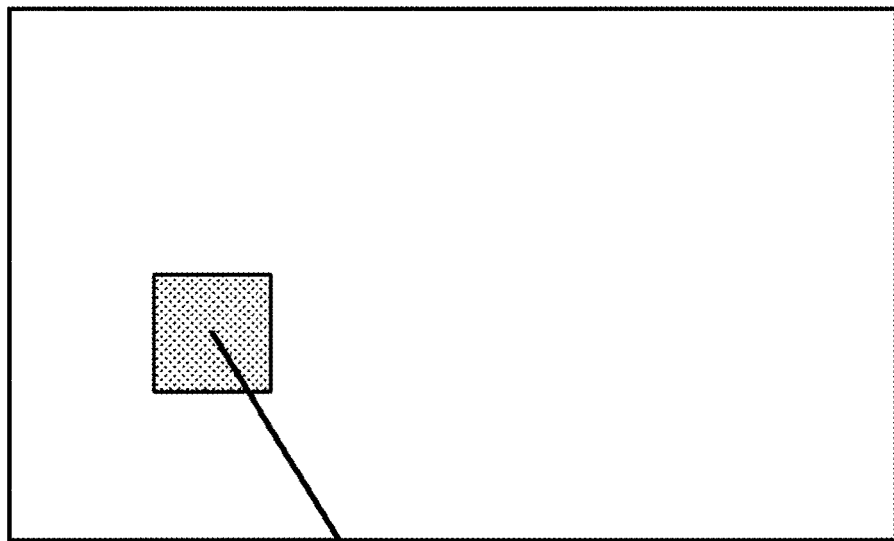
ENCODING/DECODING TARGET BLOCK
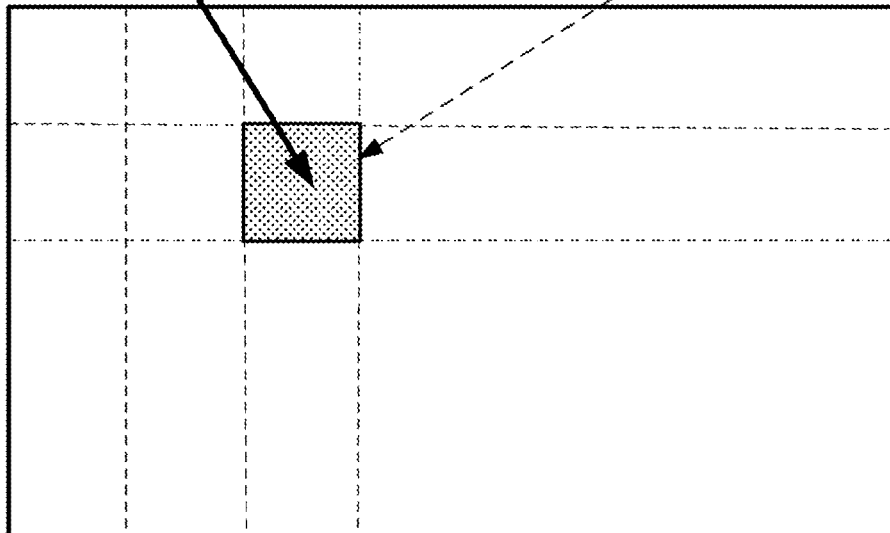
ENCODING/DECODING TARGET PICTURE

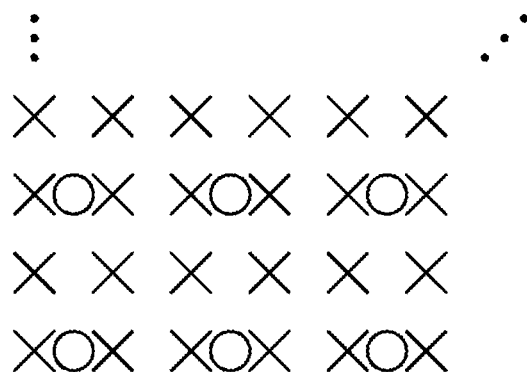
FIG.17A 4:2:0
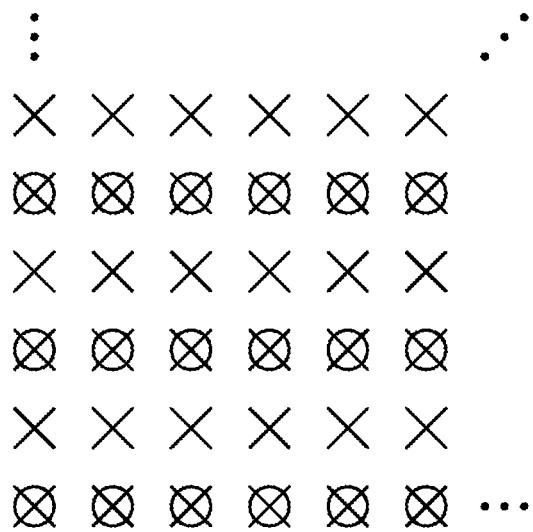
FIG.17B 4:2:2
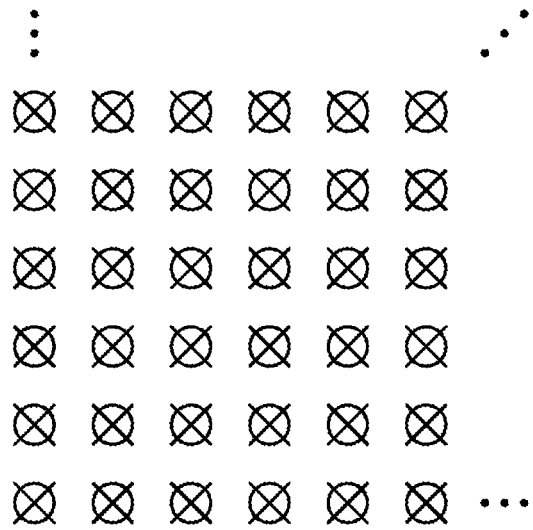
FIG.17C 4:4:4

LUMINANCE BLOCK

COLOR DIFFERENCE BLOCK

FIG.22

| MODE NUMBER | COLOR DIFFERENCE PREDICTION MODE |
|---|---|
| 0 | SAME AS LUMINANCE PREDICTION MODE |
| 1 | DC MODE |
| 2 | LUMINANCE COLOR DIFFERENCE PREDICTION |

LUMINANCE BLOCK

COLOR DIFFERENCE BLOCK

LUMINANCE BLOCK

PICTURE ENCODING DEVICE, PICTURE ENCODING METHOD, AND PICTURE ENCODING PROGRAM, AND PICTURE DECODING DEVICE, PICTURE DECODING METHOD, AND PICTURE DECODING PROGRAM

CROSS-REFERENCE TO RELATED APPLICATION

This application is a continuation of U.S. Ser. No. 17/197,495, filed Mar. 10, 2021; which is a continuation of U.S. Ser. No. 16/665,031, filed Oct. 28, 2019; which is a continuation of International Application No. PCT/JP2018/011953, filed Mar. 26, 2018; which claims the benefit of priority from the prior Japanese Patent Application No. 2017-089252, filed Apr. 28, 2017, the entire contents of which are incorporated herein by reference.

BACKGROUND OF THE INVENTION

1. Field of the Invention

The present invention relates to a technique of dividing a picture into blocks, and performing encoding and decoding for each of the divided blocks.

2. Description of the Related Art

In picture encoding and decoding, a picture is divided into blocks being a groups each including a predetermined number of pixels, and encoding and decoding are performed for each block. By performing appropriate division of blocks, encoding efficiency of intra prediction and inter prediction is enhanced. In addition, in the intra prediction, by predicting a secondary signal from a decoded picture of a primary signal, encoding efficiency is enhanced.
[patent document 1] JP2013-90015 A Nevertheless, if a secondary signal is predicted from a decoded picture of a primary signal, a processing amount increases and dependence relationship between processing on the primary signal and processing on the secondary signal is generated, and it becomes difficult to perform parallel processing.

SUMMARY OF THE INVENTION

The present invention has been devised in view of such a situation, and the object of the present invention is to provide a technique of enhancing encoding efficiency by performing block division suitable for picture encoding and decoding.

For solving the above-described issues, a picture encoding device according to one embodiment of the present invention is a picture encoding device that divides a picture into blocks and performs encoding for each of the divided blocks, and the picture encoding device includes a primary signal block divider (101) structured to divide a primary signal of the picture into rectangles having a predetermined size, and generate a primary signal block, a secondary signal block divider (101) structured to divide a secondary signal of the picture into rectangles having a predetermined size, and generate a secondary signal block, a primary signal predictor (102) structured to predict a primary signal, and a secondary signal predictor (102) structured to predict a secondary signal. The secondary signal predictor (102) can perform inter prediction of predicting a secondary signal from an encoded primary signal, and the inter prediction is restricted based on at least one of a size of the primary signal block and a size of the secondary signal block.

Another embodiment of the present invention is a picture encoding method. The method is a picture encoding method that divides a picture into blocks and performs encoding for each of the divided blocks, and the picture encoding method includes a primary signal block division step of dividing a primary signal of the picture into rectangles having a predetermined size, and generating a primary signal block, a secondary signal block division step of dividing a secondary signal of the picture into rectangles having a predetermined size, and generating a secondary signal block, a primary signal prediction step of predicting a primary signal, and a secondary signal prediction step of predicting a secondary signal. The secondary signal prediction step can perform inter prediction of predicting a secondary signal from an encoded primary signal, and the inter prediction is restricted based on at least one of a size of the primary signal block and a size of the secondary signal block.

Yet another embodiment of the present invention is a picture decoding device. The device is a picture decoding device that divides a picture into blocks and performs decoding for each of the divided blocks, and the picture decoding device includes a primary signal block divider (202) structured to divide a primary signal of the picture into rectangles having a predetermined size, and generate a primary signal block, a secondary signal block divider (202) structured to divide a secondary signal of the picture into rectangles having a predetermined size, and generate a secondary signal block, a primary signal predictor (204) structured to predict a primary signal, and a secondary signal predictor (204) structured to predict a secondary signal. The secondary signal predictor (204) can perform inter prediction of predicting a secondary signal from a decoded primary signal, and the inter prediction is restricted based on at least one of a size of the primary signal block and a size of the secondary signal block.

Yet another embodiment of the present invention is a picture decoding method. The method is a picture decoding method that divides a picture into blocks and performs decoding for each of the divided blocks, and the picture decoding method includes a primary signal block division step of dividing a primary signal of the picture into rectangles having a predetermined size, and generating a primary signal block, a secondary signal block division step of dividing a secondary signal of the picture into rectangles having a predetermined size, and generating a secondary signal block, a primary signal prediction step of predicting a primary signal, and a secondary signal prediction step of predicting a secondary signal. The secondary signal prediction step can perform inter prediction of predicting a secondary signal from a decoded primary signal, and the inter prediction is restricted based on at least one of a size of the primary signal block and a size of the secondary signal block.

In addition, any combination of the above-described constituent elements, and an aspect obtained by converting a wording in the present invention between a method, an apparatus, a system, a recording medium, a computer program, and the like are also effective as an aspect of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 11 is a diagram illustrating a state of redivision of divided block when a tree block is divided into two in the horizontal direction;

FIG. 13 is a diagram illustrating a state of redivision of divided block when a tree block is divided into two in the vertical direction;

FIG. 14 is a diagram illustrating an example of a syntax regarding block division of the first embodiment;

FIGS. 15A, 15B, 15C, and 15D, are a diagram illustrating intra prediction;

FIG. 16 is a diagram illustrating inter prediction;

FIGS. 17A, 17B, and 17C are a diagram illustrating a color difference format;

FIG. 22 is a diagram illustrating an example of a syntax of an intra color difference prediction mode;

DETAILED DESCRIPTION OF THE INVENTION

The invention will now be described by reference to the preferred embodiments. This does not intend to limit the scope of the present invention, but to exemplify the invention.

An embodiment of the present invention provides a picture encoding technique of dividing a picture into rectangular blocks, and encoding/decoding a divided block.

First Embodiment

A picture encoding device 100 and a picture decoding device 200 according to a first embodiment of the present invention will be described.

Figure 1:
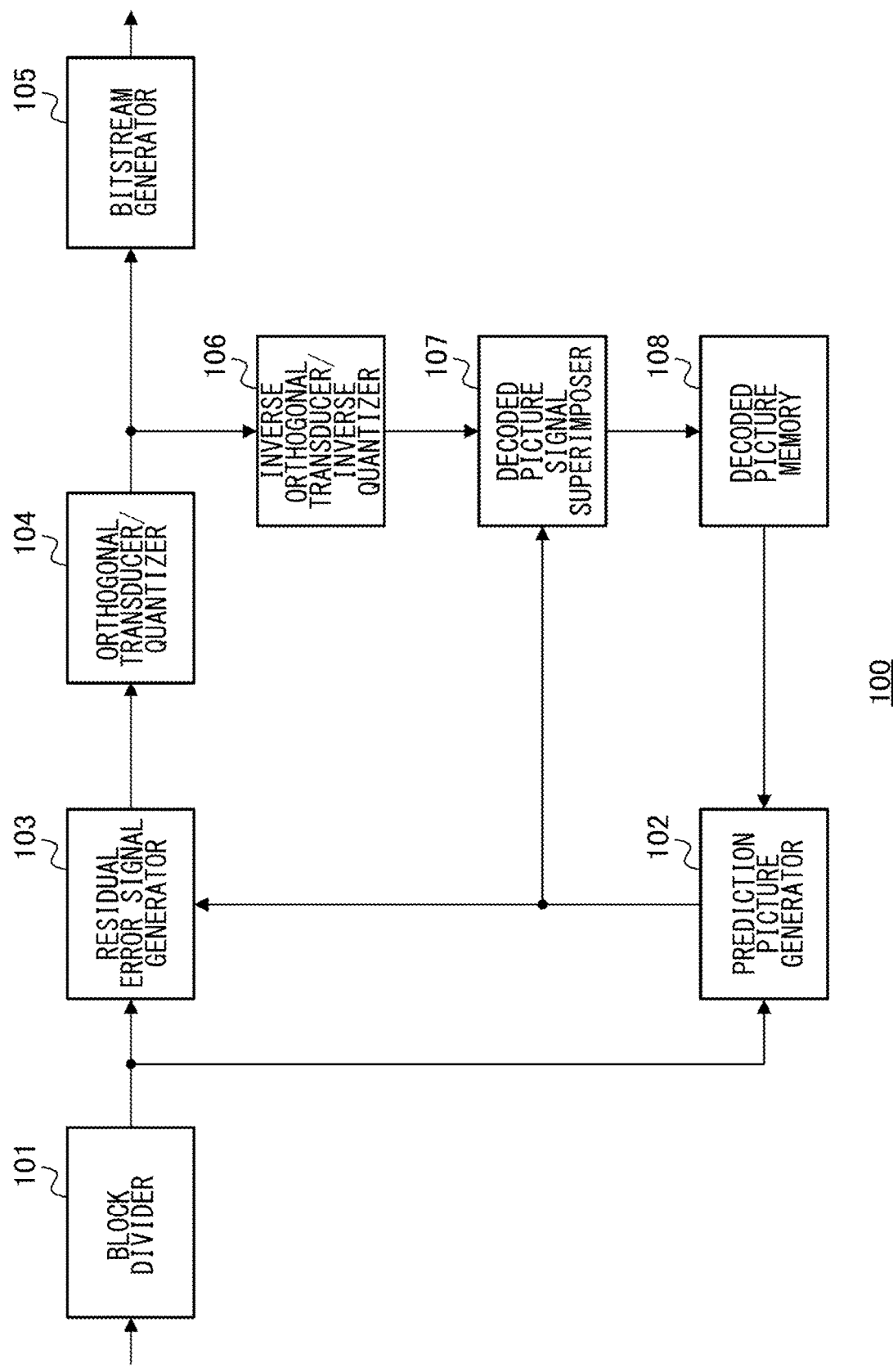
FIG. 1 is a configuration diagram of a picture encoding device according to a first embodiment.

FIG. 1 is a configuration diagram of the picture encoding device 100 according to the first embodiment. Here, FIG. 1 illustrates only a flow of data regarding a picture signal, and a flow of data regarding additional information is not illustrated. Each constituent element supplies the additional information other than a picture signal, such as a motion vector or a prediction mode, to a bitstream generator 105, and the bitstream generator 105 generates corresponding encoded data.

A block divider 101 divides a picture into encoding target blocks each serving as an encoding processing unit, and supplies a picture signal in an encoding target block to a residual error signal generator 103. In addition, the block divider 101 supplies the picture signal in the encoding target block to a prediction picture generator 102 for evaluating a coincidence degree of a prediction picture.

The block divider 101 generates an encoding target block by recursively dividing a picture into rectangles having a predetermined size. The block divider 101 includes four dividers that generate four blocks by dividing a target block in recursive division into four in the horizontal and vertical directions, and two dividers that generate two blocks by dividing a target block in recursive division into two in the horizontal direction or the vertical direction. The detailed operation of the block divider 101 will be described later.

The prediction picture generator 102 performs intra prediction or inter prediction based on a prediction mode from a decoded picture signal supplied from a decoded picture memory 108, and generates a prediction picture signal. A picture signal in an encoding target block that is supplied from the block divider 101 is used for evaluation in intra prediction and inter prediction. In the intra prediction, using a picture signal of an encoding target block that is supplied from the block divider 101, and a picture signal of a neighboring encoded block neighboring an encoding target block existing in the same picture as an encoding target block supplied from the decoded picture memory 108, a prediction picture signal is generated. In the inter prediction, using a picture signal of an encoding target block that is supplied from the block divider 101, an encoded picture stored in the decoded picture memory 108 and provided anterior to or posterior to a picture including an encoding target block (encoding picture) in chronological order is regarded as a reference picture, block coincidence degree evaluation such as block matching is performed between the encoding picture and the reference picture, a motion vector indicating a motion amount is obtained, motion compensation is performed from the reference picture based on the motion amount, and a prediction picture signal is generated. The prediction picture generator 102 supplies the prediction picture signal generated in this manner, to the residual error signal generator 103.

The residual error signal generator 103 generates a residual error signal by performing subtraction of a picture signal to be encoded and a prediction signal generated by the prediction picture generator 102, and supplies the residual error signal to an orthogonal transducer/quantizer 104.

The orthogonal transducer/quantizer 104 performs orthogonal transform and quantization of the residual error signal supplied from the residual error signal generator 103, and supplies the residual error signal subjected to orthogonal transform and quantization, to the bitstream generator 105 and an inverse orthogonal transducer/inverse quantizer 106.

The bitstream generator 105 generates a bitstream for the residual error signal subjected to orthogonal transform and quantization that is supplied from the orthogonal transducer/quantizer 104. In addition, the bitstream generator 105 generates a corresponding bitstream as for additional information such as motion vector, a prediction mode, or block division information.

The inverse orthogonal transducer/inverse quantizer 106 performs inverse quantization and inverse orthogonal transform of the residual error signal subjected to orthogonal transform and quantization that is supplied from the orthogonal transducer/quantizer 104, and supplies the residual error signal subjected to inverse quantization and inverse orthogonal transform, to a decoded picture signal superimposer 107.

The decoded picture signal superimposer 107 generates a decoded picture by superimposing the prediction picture signal generated by the prediction picture generator 102, and the residual error signal subjected to inverse quantization and inverse orthogonal transform by the inverse orthogonal transducer/inverse quantizer 106, and stores the decoded picture in the decoded picture memory 108. In addition, in some cases, filtering processing for reducing block distortion caused by encoding is performed on the decoded picture, and the resultant decoded picture is stored in the decoded picture memory 108.

Figure 2:
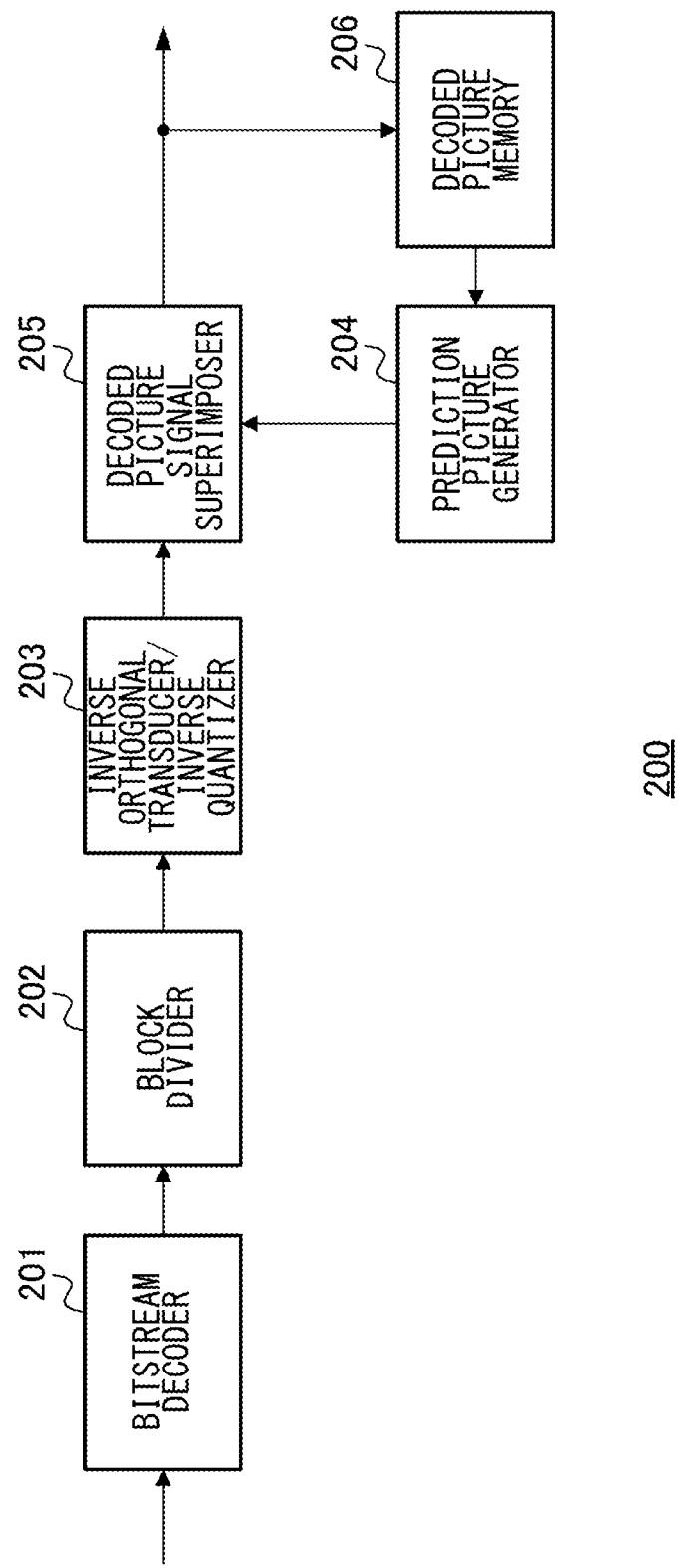
FIG. 2 is a configuration diagram of a picture decoding device according to the first embodiment.

FIG. 2 is a configuration diagram of the picture decoding device 200 according to the first embodiment. Here, FIG. 2 illustrates only a flow of data regarding a picture signal, and a flow of data regarding additional information is not illustrated. A bitstream decoder 201 supplies the additional information other than a picture signal, such as a motion vector or a prediction mode, to each constituent element, and uses the additional information for corresponding processing.

The bitstream decoder 201 decodes a supplied bitstream and supplies a residual error signal subjected to orthogonal transform and quantization, to a block divider 202.

The block divider 202 decides the shape of a decoding target block based on decoded block division information, and supplies a residual error signal of the decided decoding target block that has been subjected to orthogonal transform and quantization, to an inverse orthogonal transducer/inverse quantizer 203.

The block divider 202 generates a decoding target block by recursively dividing a picture into rectangles having a predetermined size, based on the decoded block division information. The block divider 202 includes four dividers that generate four blocks by dividing a target block in recursive division into four in the horizontal and vertical directions, and two dividers that generate two blocks by dividing a target block in recursive division into two in the horizontal direction or the vertical direction. The detailed operation of the block divider 202 will be described later.

The inverse orthogonal transducer/inverse quantizer 203 performs inverse orthogonal transform and inverse quantization on the supplied residual error signal subjected to orthogonal transform and quantization, and obtains a residual error signal subjected to inverse orthogonal transform and inverse quantization.

A prediction picture generator 204 generates a prediction picture signal from a decoded picture signal supplied from a decoded picture memory 206, and supplies the prediction picture signal to a decoded picture signal superimposer 205.

The decoded picture signal superimposer 205 generates a decoded picture signal by superimposing the prediction picture signal generated by the prediction picture generator 204, and the residual error signal subjected to inverse orthogonal transform and inverse quantization by the inverse orthogonal transducer/inverse quantizer 203, outputs the decoded picture signal, and stores the decoded picture signal into the decoded picture memory 206. In addition, in some cases, filtering processing for reducing block distortion caused by encoding is performed on the decoded picture, and the resultant decoded picture is stored in the decoded picture memory 206.

Figure 3:
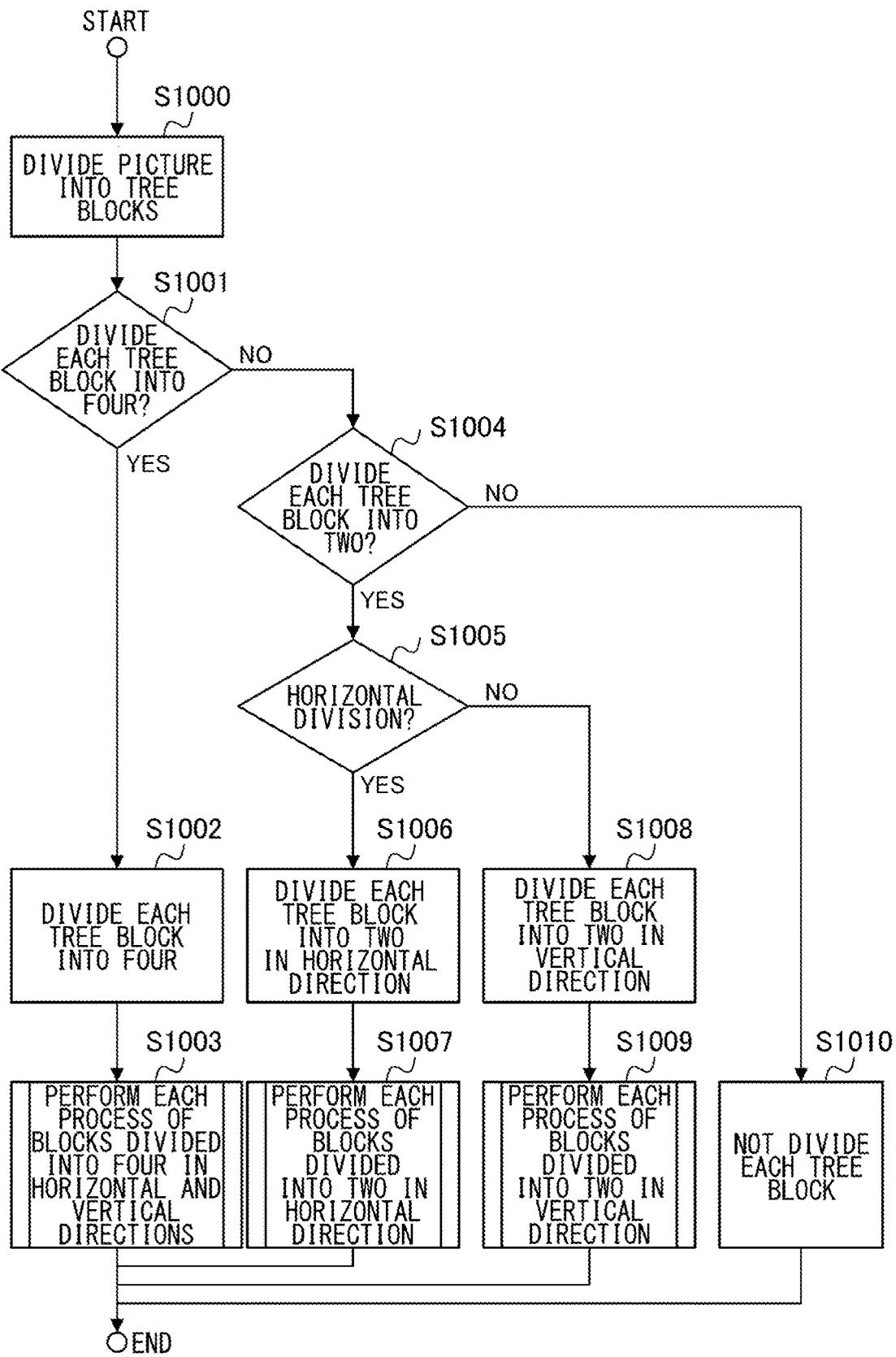
FIG. 3 is a flowchart illustrating division into tree blocks and division of each tree block.

An operation of the block divider 101 of the picture encoding device 100 will be described in detail. FIG. 3 is a flowchart illustrating division into tree blocks and division of each tree block.

Figure 4:
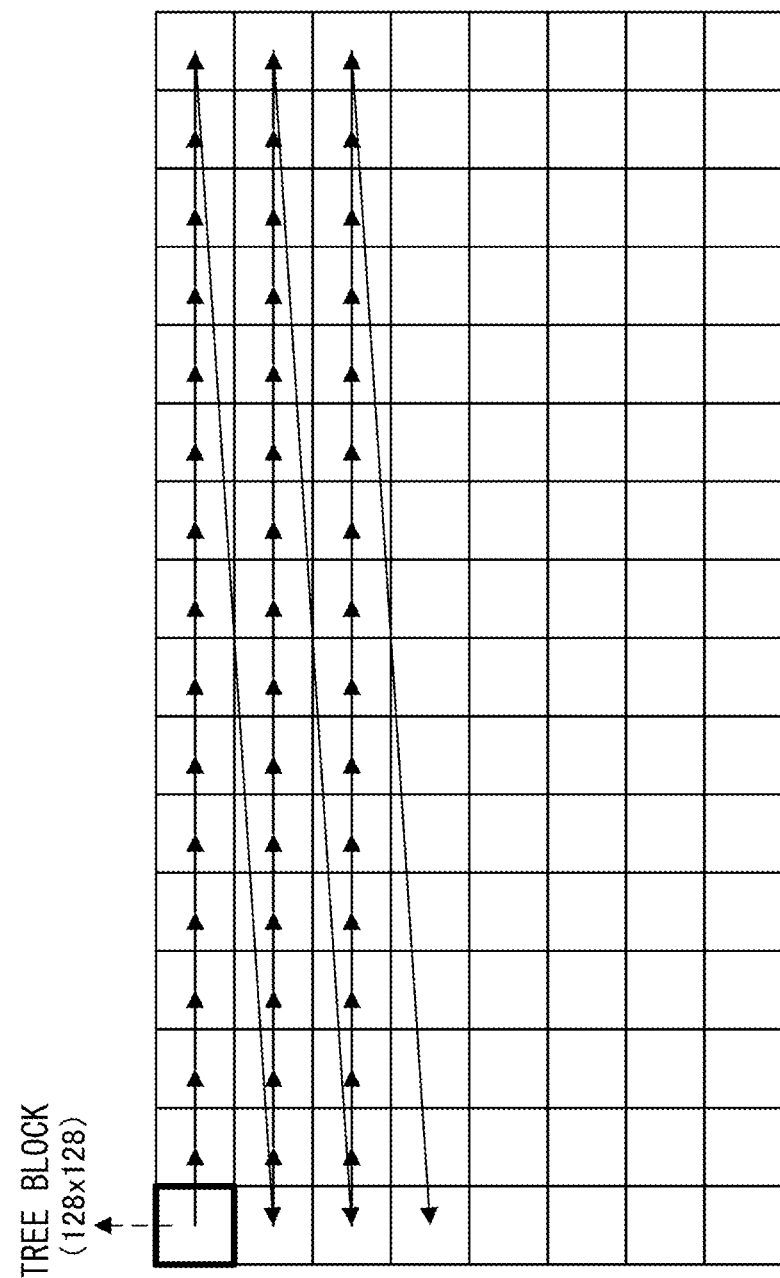
FIG. 4 is a diagram illustrating a state in which an input picture is divided into tree blocks.

First of all, an input picture is divided into tree blocks having a predetermined size (S1000). For example, a tree block includes 128 pixels×128 pixels. Nevertheless, the size of the tree block is not limited to 128 pixels×128 pixels, and any size and shape may be used as long as the tree block is rectangular. In addition, as for the size and shape of the tree block, fixed values may be defined in an encoding device and a decoding device. Alternatively, the encoding device may decide a block size and record the block size in a bitstream, and the decoding device may use the recorded block size. FIG. 4 illustrates a state in which an input picture is divided into tree blocks. Tree blocks are encoded and decoded in a raster scan order, that is to say, from the left to the right and from the top to the bottom.

Figure 5:
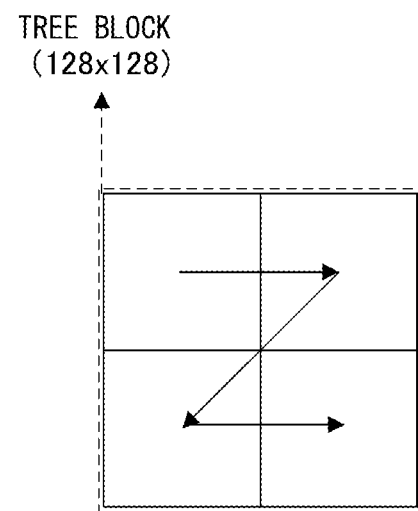
FIG. 5 is a diagram illustrating z-scan.
Figure 6:
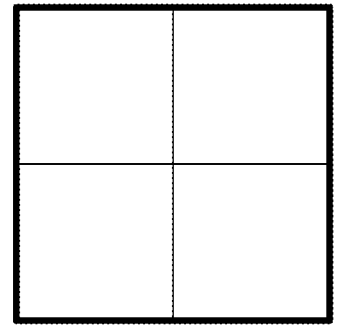
FIG. 6 is a diagram illustrating a tree block divided into four in horizontal and vertical directions.
Figure 7:
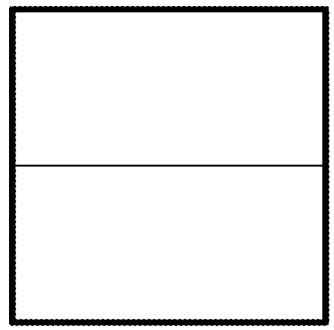
FIG. 7 is a diagram illustrating a tree block divided into two in the horizontal direction.
Figure 8:
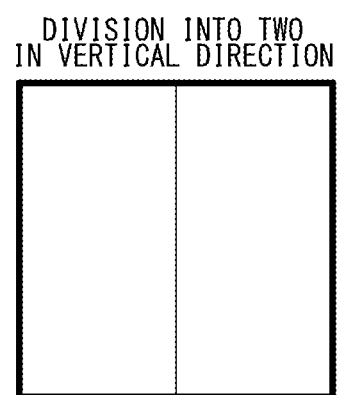
FIG. 8 is a diagram illustrating a tree block divided into two in the vertical direction.

Each tree block is further divided into rectangular blocks. Each tree block is encoded and decoded in a z-scan order. FIG. 5 illustrates the z-scan order. In the z-scan, encoding and decoding are performed in the order of upper left, upper right, lower left, and the lower right. Each tree block can be divided into four or two, and each tree block is divided into four in the horizontal and vertical directions. Each tree block is divided into two in the horizontal direction or the vertical direction. FIG. 6 is a diagram illustrating a tree block divided into four in horizontal and vertical directions. FIG. 7 is a diagram illustrating a tree block divided into two in the horizontal direction. FIG. 8 is a diagram illustrating a tree block divided into two in the vertical direction.

The description will be continued referring back to FIG. 3. It is determined whether or not to divide the tree block into four in the horizontal and the vertical directions (S1001).

Figure 9:
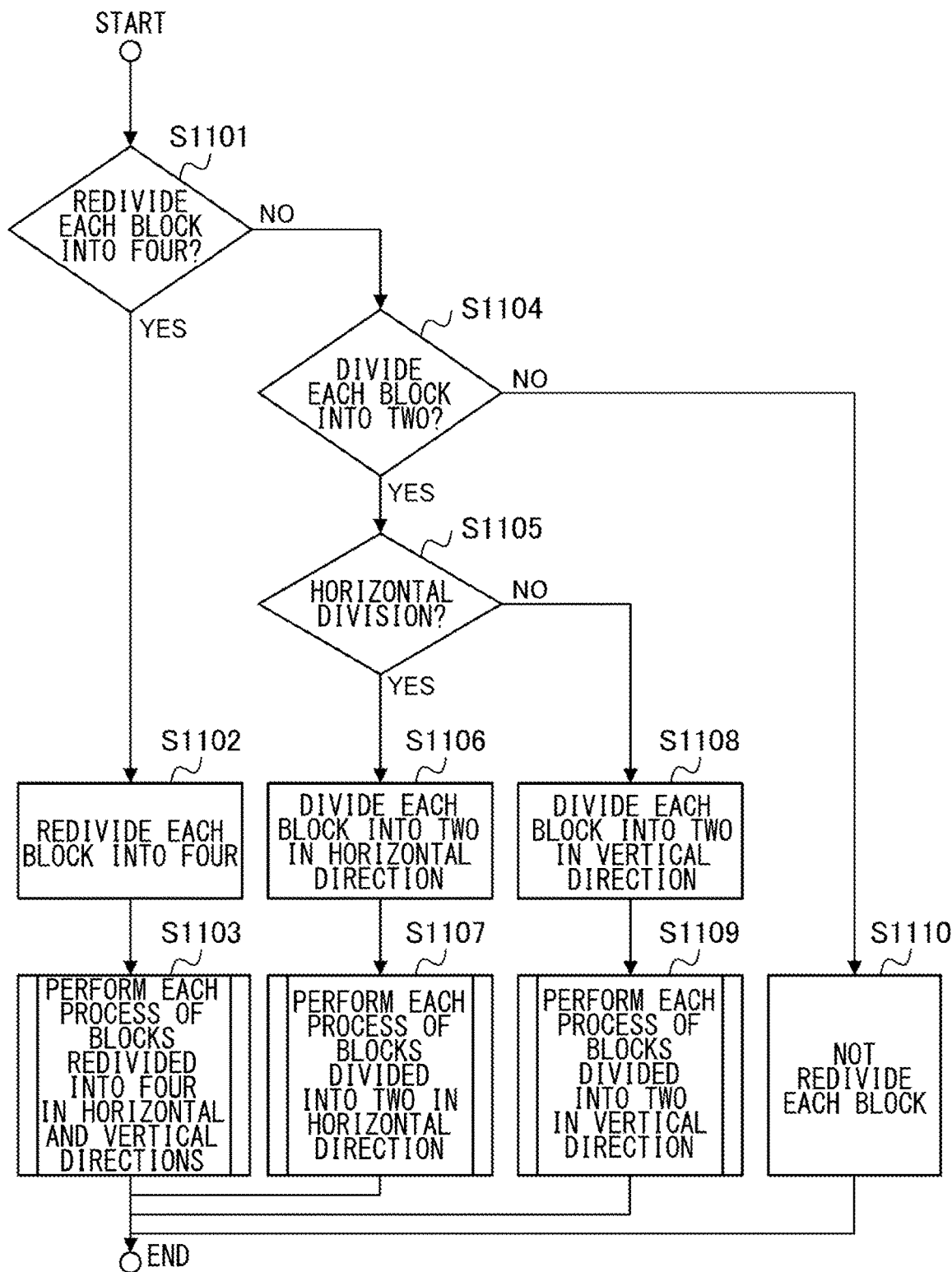
FIG. 9 is a flowchart illustrating processing on each divided block when a tree block is divided into four in the horizontal and vertical directions.

When it is determined that each tree block is divided into four (S1001: Yes), each tree block is divided into four (S1002), and each process of blocks divided into four in the horizontal and vertical directions is performed (S1003). Redivision processing of blocks divided into four will be described later (FIG. 9).

When it is determined that each tree block is not divided into four (S1001: No), it is determined whether or not to divide each tree block into two (S1004).

When it is determined that each tree block is divided into two (S1004: Yes), it is determined whether or not to set a direction in which each tree block is divided into two, to the horizontal direction (S1005).

Figure 10:
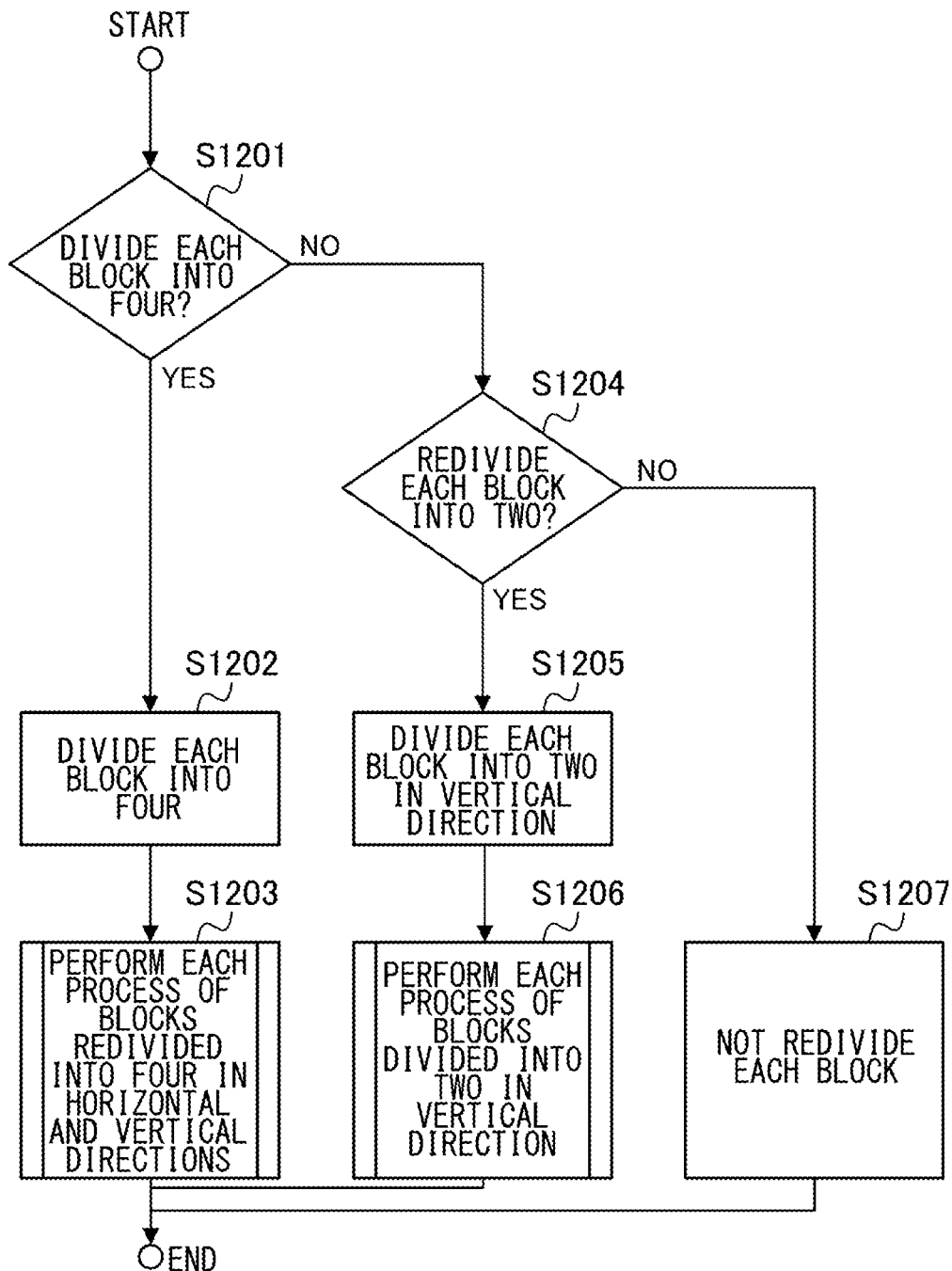
FIG. 10 is a flowchart illustrating processing on each divided block when a tree block is divided into two in the horizontal direction.

When it is determined that a direction in which each tree block is divided into two is set to the horizontal direction (S1005: Yes), each tree block is divided into two in the horizontal direction (S1006), and each process of blocks divided into two in the horizontal direction is performed (S1007). Redivision processing of blocks divided into two in the horizontal direction will be described later (FIG. 10).

When it is determined that a direction in which each tree block is divided into two is set not to the horizontal direction but to the vertical direction (S1005: No), each tree block is divided into two in the vertical direction (S1008), and each process of blocks divided into two in the vertical direction is performed (S1009). Redivision processing of blocks divided into two in the horizontal direction will be described later (FIG. 11).

When it is determined that each tree block is not divided into two (S1004: No), each tree block is not divided and block division processing ends (S1010).

Subsequently, processing on each divided block when a tree block is divided into four in the horizontal and vertical directions will be described using a flowchart in FIG. 9.

It is determined whether or not to redivide each block into four in the horizontal and the vertical directions (S1101).

When it is determined that each block is redivided into four (S1101: Yes), each block is redivided into four (S1102), and each process of blocks divided into four in the horizontal and vertical directions is performed (S1103).

When it is determined that each block is not redivided into four (S1101: No), it is determined whether or not to divide each block into two (S1104).

When it is determined that each block is divided into two (S1104: Yes), it is determined whether not to set a direction in which each block is divided into two, to the horizontal direction (S1105).

When it is determined that a direction in which each block is divided into two is set to the horizontal direction (S1105: Yes), each block is divided into two in the horizontal direction (S1106), and each process of blocks divided into two in the horizontal direction is performed (S1107).

When it is determined that a direction in which each block is divided into two is set not to the horizontal direction but to the vertical direction (S1105: No), each block is divided into two in the vertical direction (S1108), and each process of blocks divided into two in the vertical direction is performed (S1109).

When it is determined that each block is not divided into two (S1104: No), each block is not divided and block division processing ends (S1110).

The processing illustrated in the flowchart in FIG. 9 is executed on each of the blocks divided into four. Each of the blocks divided into four is also encoded and decoded in the z-scan order.

Subsequently, processing on each divided block when a tree block is divided into two in the horizontal direction will be described using a flowchart in FIG. 10.

When a tree block is divided into two in the horizontal direction, first of all, it is determined whether not to divide each of the blocks divided into two, into four in the horizontal and the vertical directions (S1201).

When it is determined that each block is divided into four (S1201: Yes), each block is divided into four (S1202), and each process of blocks divided into four in the horizontal and vertical directions is performed (S1203).

When it is determined that each block is not divided into four (S1201: No), it is determined whether or not to redivide each block into two (S1204).

When it is determined that each block is redivided into two (S1204: Yes), each block is divided in the vertical direction (S1205), and each process of blocks divided into two in the vertical direction is performed (S1206).

When it is determined that each block is not redivided into two (S1204: No), each block is not redivided and block division processing ends (S1207).

FIG. 11 illustrates a state of redivision of divided block when a tree block is divided into two in the horizontal direction. Here, when a tree block serving as a parent block is divided into two in the horizontal direction, in the redivision into two of the divided block, the divided block is allowed to be divided into two only in the vertical direction, and is automatically divided into two in the vertical direction. In addition, when a tree block serving as a parent block is divided into two, a child block can also be strictly prohibited from being divided into four. This can prohibit a block from being divided in the same direction as a parent block. It is therefore possible to prevent block division that makes an oblong more elongated in a transverse direction, and facilitate processing of encoding and decoding.

The processing illustrated in the flowchart in FIG. 10 is executed on each of the blocks divided into two in the horizontal direction. Each of the blocks divided into two is also encoded and decoded in the order of top and down.

Subsequently, processing on each divided block when a tree block is divided into two in the vertical direction will be described using a flowchart in FIG. 12.

When a tree block is divided into two in the vertical direction, first of all, it is determined whether not to divide each of the blocks divided into two, into four in the horizontal and the vertical directions (S1301).

When it is determined that each block is divided into four (S1301: Yes), each block is divided into four (S1302), and each process of blocks divided into four in the horizontal and vertical directions is performed (S1303).

When it is determined that each block is not divided into four (S1301: No), it is determined whether or not to redivide each block into two (S1304).

When it is determined that each block is redivided into two (S1304: Yes), each block is divided in the horizontal direction (S1305), and each process of blocks divided into two in the horizontal direction is performed (S1306).

When it is determined that each block is not redivided into two (S1304: No), each block is not redivided and block division processing ends (S1307).

FIG. 13 illustrates a state of redivision of divided block when a tree block is divided into two in the vertical direction. Here, when a tree block serving as a parent block is divided into two in the vertical direction, in the redivision into two of the divided block, the divided block is allowed to be divided into two only in the horizontal direction, and is automatically divided into two in the horizontal direction. In addition, when a tree block serving as a parent block is divided into two, a child block can also be strictly prohibited from being divided into four. This can prohibit a block from being divided in the same direction as a parent block. It is therefore possible to prevent block division that makes an oblong more elongated in a longitudinal direction, and facilitate processing of encoding and decoding.

Figure 12:
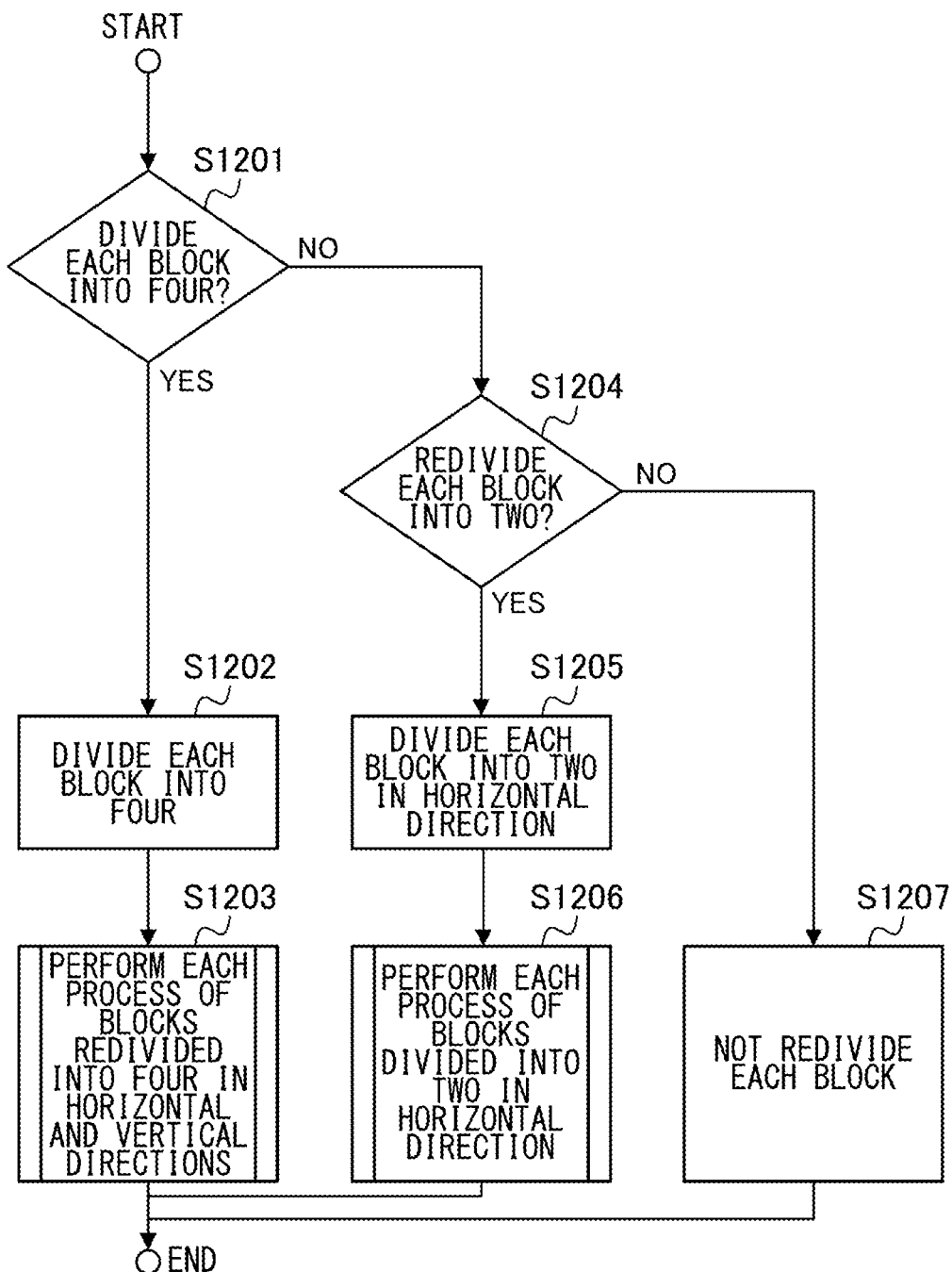
FIG. 12 is a flowchart illustrating processing on each divided block when a tree block is divided into two in the vertical direction.

The processing illustrated in the flowchart in FIG. 12 is executed on each of the blocks divided into two in the vertical direction. Each of the blocks divided into two is also encoded and decoded in the order of left and right.

In addition, the redivision of a divided block performed when a tree block is divided has been described, but a parent block needs not be a tree block. For example, when a tree block (128×128) is divided into four and each of the blocks (64×64) divided into four is further divided into four or two, the above-described processing is applied also to the division of a redivided block.

Next, an operation of the block divider 202 of the picture decoding device 200 will be described. The block divider 202 divides a block using the same processing procedure as the block divider 101 of the picture encoding device 100, but the processing procedure partially differs in the following manner. While the block divider 101 of the picture encoding device 100 selects a pattern of block division and outputs selected block division information, the block divider 202 of the picture decoding device has a syntax structure of dividing a block using block division information decoded from a bitstream, and not transmitting unselectable information in a bitstream under a situation in which the redivision in the same direction is prohibited, when decoding block division information from a bitstream.

FIG. 14 illustrates an example of a syntax (syntactic rule of bitstream) related to the block division of the first embodiment. For the division of each tree block, first of all, a flag indicating whether or not to divide each tree block into four (4_division_flag) is transmitted and received. When each tree block is divided into four (4_division_flag indicates 1), each tree block is divided into four, and the processing ends. After that, each of the blocks divided into four is redivided using the syntax illustrated in FIG. 14 again. When each tree block is not divided into four (4_division_flag indicates 0), a flag indicating whether or not to divide each tree block into two (2_division_flag) is transmitted and received. When each tree block is divided into two (2_division_flag indicates 1), a flag indicating a direction in which each tree block is divided into two (2_division_direction) is further transmitted and received. When the flag 2_division_direction indicates 1, the flag indicates the division in the vertical direction, and when the flag 2_division_direction indicates 0, the flag indicates the division in the horizontal direction. After that, each of the blocks divided into two is redivided using the syntax illustrated in FIG. 14 again. When each tree block is not divided into two (2_division_flag is 0), each tree block is not divided, and the processing ends.

Here, processing of redividing each of the blocks divided into four or two will be described. The processing of redividing each block also uses the syntax illustrated in FIG. 14, but differs from the processing performed when a tree block is divided, in that a division direction in which each block is divided into two is restricted. More specifically, when a tree block is divided into two, when each of the blocks divided into two is redivided, division in the same direction as a division direction in which the tree block is divided into two is prohibited. This can prevent the divided block from becoming a more elongated oblong, and prevent an increase in memory bandwidth required in intra prediction or inter prediction. The details of the prevention of an increase in memory bandwidth will be described later.

In addition, it should be appreciated that the number of times a block is divided into two in the same direction may be counted, and division in the same direction may be restricted when the counted number exceeds a predetermined time. For example, while a block is allowed to be divided into two in the same direction twice or less, a block is prohibited from being divided into two in the same direction three times or more.

FIG. 14 illustrates a syntax in which division into four is preferentially selected and information indicating whether or not to divide into four is transmitted and received earlier than information indicating whether or not to divide into two. On the other hand, when division into two is preferentially selected, a syntax of transmitting and receiving information indicating whether or not to divide into two, earlier than information indicating whether or not to divide into four can be employed. This is because an encoding amount to be transmitted as a bitstream becomes smaller if an event that is more likely to occur stochastically is transmitted and received earlier. More specifically, which of the division into four and the division into two is more likely to occur may be estimated in advance, and a syntax of transmitting and receiving division information more likely to occur, earlier may be employed. For example, by transmitting and receiving whether or not to prioritize division into four or division into two, using header information of a picture, an encoding device can adaptively decide a prioritized division number having high encoding efficiency, and a decoding device can divide each tree block using a syntax that is based on the selected prioritized division number.

In the picture encoding device 100 and the picture decoding device 200, intra prediction and inter prediction are performed using a divided block. Both of the intra prediction and inter prediction involve the copy of pixels from a memory.

FIGS. 15(a) to 15(d) illustrate an example of intra prediction. FIGS. 15(a) and 15(b) illustrate a prediction direction and a mode number of intra prediction. As illustrated in FIGS. 15(c) and 15(d), intra prediction generates a prediction picture of an encoding/decoding target block by copying pixels from encoded/decoded pixels neighboring the encoding/decoding target block. In intra prediction, because prediction picture generation to encoding/decoding pixel generation are repeated for each block, a processing order becomes sequential for each block, and as each block is divided into smaller blocks, load on the entire processing increases. In addition, as the shape of the block becomes a more elongated oblong, processing of pixel copy from a memory becomes larger. In addition, because orthogonal transform of a residual error signal is performed for encoding and decoding, as the number of types of the size of a rectangle increases, the number of types of required orthogonal transform increases, and a circuit size is consequently increased. Thus, when each block is divided into two, by restricting division into two in the same direction as a division method of a parent block, an increase in memory bandwidth required for intra prediction can be prevented.

FIG. 16 illustrates an example of inter prediction. The inter prediction generates a prediction picture of an encoding/decoding target block by copying pixels for each block from pixels included in an encoded/decoded picture. In the inter prediction, when a pixel is copied from a reference picture for each block, a device often has a configuration requiring the acquisition in the management unit of a memory including a required pixel. Thus, as a block is divided into smaller blocks, and in addition, as the shape of the block becomes a more elongated oblong, load on the entire processing increases. In addition, when motion compensation with decimal accuracy is performed on a reference picture using an interpolation filter, it is necessary to copy pixels by adding several pixels to pixels included in a block, and as the size of the block becomes smaller, a relative rate of several pixels to be added increases, and load on the entire processing increases. Thus, when each block is divided into two, by restricting division into two in the same direction as a division direction of a parent block, an increase in memory bandwidth required for inter prediction can be prevented.

Subsequently, a relationship between a luminance signal and a color difference signal in intra prediction will be described. As a format of a luminance signal and a color difference signal, 4:2:0, 4:2:2, 4:4:4, and the like have been conventionally known. While the 4:2:0 format illustrated in FIG. 17(a) performs sampling of two pixels both in the horizontal/vertical direction for a luminance signal, the 4:2:0 format performs sampling of one pixel both in the horizontal/vertical direction for a color difference signal. Because human eyes can perceive a luminance signal more sensitively than a color difference signal, an information amount of the color difference signal is made smaller than that of the luminance signal. While a 4:2:2 format illustrated in FIG. 17(b) performs sampling of two pixels in the horizontal direction for a luminance signal, the 4:2:2 format performs sampling of one pixel in the horizontal direction for a color difference signal. Regarding the vertical direction, the 4:2:2 format performs sampling of two pixels in the vertical direction for a luminance signal, the 4:2:2 format performs sampling of two pixels in the vertical direction for a color difference signal. While a 4:4:4 format illustrated in FIG. 17(c) performs sampling of two pixels in the horizontal/vertical direction for a luminance signal, the 4:4:4 format performs sampling of two pixels both in the horizontal/vertical directions for a color difference signal.

The present embodiment will be described using the 4:2:0 format used in picture encoding most widely as an example. The block divider 101 or 202 includes a luminance block divider that generates a luminance block by dividing a luminance signal of a picture, and a color difference block divider that generates a color difference block by dividing a color difference signal of a picture, and in the intra prediction, independently divides a luminance signal and a color difference signal into blocks. More specifically, in the intra prediction, a size of a luminance block and a size of a color difference block are independently decided. In the intra prediction, because a luminance signal and a color difference signal each copy pixel values from neighboring pixels, if the luminance signal and the color difference signal are independently divided into blocks, prediction efficiency is enhanced. In contrast this, as for inter prediction, a luminance signal and a color difference signal are divided into blocks in company with each other. More specifically, in the inter prediction, a size of a luminance block and a size of a color difference block are the same. This is because there is no need to distinguish between luminance and a color difference in motion compensation in the inter prediction.

The prediction picture generator 102 or 204 includes a luminance signal predictor that predicts a luminance signal and a color difference signal predictor that predicts a color difference signal, and the color difference signal predictor performs luminance color difference intra prediction of predicting a color difference signal from an encoded/decoded pixel of a luminance signal for enhancing prediction efficiency of a color difference signal in the intra prediction. In the luminance color difference intra prediction, a primary signal is encoded/decoded prior to a secondary signal, and the secondary signal is predicted using the encoded/decoded primary signal. Here, because an information amount of a luminance signal is larger than that of a color difference signal in the 4:2:0 format and the 4:2:2 format, a luminance signal is regarded as a primary signal and a color difference signal is regarded as a secondary signal. In the 4:4:4 format, information amounts of a luminance signal and a color difference signal are the same, but it is normal that a luminance signal is regarded as a primary signal and a color difference signal is regarded as a secondary signal similarly to the other formats.

Figure 18:
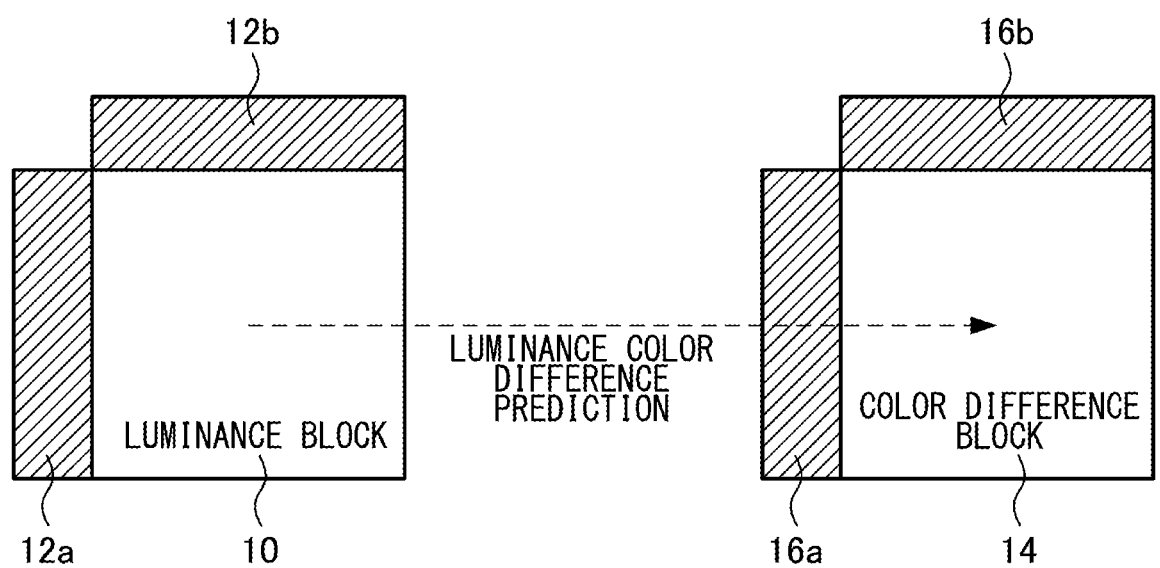
FIG. 18 is a diagram illustrating luminance color difference intra prediction.
Figure 19:
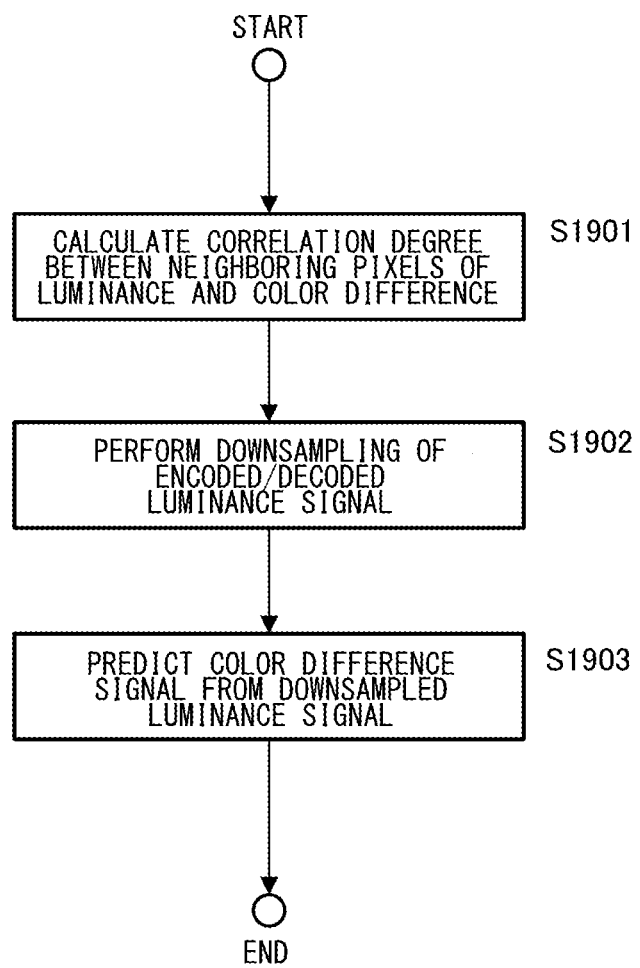
FIG. 19 is a flowchart illustrating luminance color difference intra prediction.

FIG. 18 is a diagram illustrating luminance color difference intra prediction and FIG. 19 is a flowchart illustrating luminance color difference intra prediction.

As illustrated in FIG. 18, luminance color difference intra prediction is performed based on a correlation degree between encoded/decoded neighboring pixels 12a and 12b of a luminance block 10 and encoded/decoded neighboring pixels 16a and 16b of a color difference block 14. Because the luminance color difference intra prediction predicts a color difference signal, neighboring pixels serving as calculation targets of a correlation degree are defined based on neighboring pixels of an encoding/decoding target color difference block. In other words, neighboring pixels of a luminance block at the same position as neighboring pixels decided for a color difference block become calculation targets of a correlation degree.

First of all, a correlation degree between neighboring pixels of an encoded/decoded luminance signal and neighboring pixels of a color difference signal is calculated (S1901). Subsequently, downsampling of an encoded/decoded luminance signal of an encoding/decoding target block is performed (S1902). Here, a plurality of filter types of downsampling may be prepared and a filter type may be selected. For example, a plurality of filter types may be selected by preparing filters having different intensities, or a plurality of filter types may be selected by preparing filters having different filter lengths. A filter type may be automatically selected using a correlation degree between neighboring pixels or a filter type may be transmitted into a bitstream with being encoded/decoded. In addition, unless a downsampling filter of a luminance signal of an encoding/decoding target block is decided using a correlation degree between neighboring pixels, the processing in step S1901 and the processing in step S1902 are performed in any order, and the processing in step S1901 and the processing in step S1902 can be performed in parallel.

Lastly, based on a correlation degree between neighboring pixels, a color difference signal is predicted from the downsampled luminance signal (S1903). The downsampling is ½ in the horizontal/vertical direction in the case of the 4:2:0 format. In the case of the 4:2:2 format, downsampling is ½ in the horizontal direction and downsampling is not performed in the vertical direction. The downsampling is not performed in both of the horizontal/vertical directions in the case of the 4:4:4 format.

In the luminance color difference intra prediction, after the encoding/decoding of a luminance signal of an encoding/decoding target block is completed, prediction processing of a color difference signal can be started. Thus, a timing at which prediction processing of a color difference signal can be started depends on the size of a luminance block and the size of a color difference block.

Figure 20A:
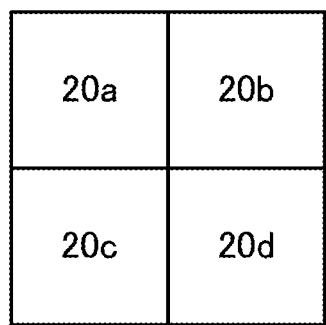
FIGS. 20A and 20B are a diagram illustrating a case where a size of a color difference block is larger than a size of a luminance block.
Figure 20B:
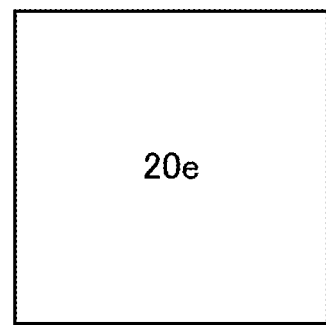

FIGS. 20(a) and 20(b) are diagrams illustrating luminance color difference intra prediction in a case where a size of a color difference block is larger than a size of a luminance block. The number of pixels of first to fourth luminance blocks 20a, 20b, 20c, and 20d divided into four that are illustrated in FIG. 20(a) is 16×16, and the number of pixels of a color difference block 20e illustrated in FIG. 20(b) is 16×16.

Here, the comparison between the sizes of the luminance block and the color difference block is not comparison between the numbers of pixels in the blocks but the comparison between areas considering a color difference format. More specifically, in the 4:2:0 format, because an area occupied by a luminance block is ½ of an area occupied by a color difference block, when the number of pixels of the luminance block is 16×16 and the number of pixels of the color difference block is 16×16, the size of the luminance block is smaller. In the 4:2:0 format, when the number of pixels of the luminance block is 16×16 and the number of pixels of the color difference block is 8×8, areas occupied by the both blocks are the same, and the luminance block and the color difference block have the same size.

For performing the comparison between sizes of a luminance block and a color difference block, not by the comparison between areas of the blocks but by the comparisons between the numbers of pixels in the blocks, the number of pixels of the color difference block is only required to be converted into the number of pixels of the luminance block at a ratio between the luminance signal and the color difference signal in the color difference format. In the case of the 4:2:0 format, because the number of pixels of the luminance signal is twice as larger as the number of pixels of the color difference signal, by doubling the numbers of pixels in height and the width of the color difference block, the numbers of pixels are converted into the numbers of pixels in height and the width of the luminance block. For example, in the 4:2:0 format, when the size of the luminance block is 16×16 and the size of the color difference block is 16×16, the converted size of the color difference block that has been converted into the number of pixels of the luminance block is 32×32, and it can be seen that the size of the color difference block is larger.

In the intra prediction, after decoding processing is completed for each block, prediction processing of a subsequent block is enabled. More specifically, after the decoding of the first luminance block 20a is completed, the decoding of the second luminance block 20b is enabled, after the decoding of the second luminance block 20b is completed, the decoding of the third luminance block 20c is enabled, and after the decoding of the third luminance block 20c is completed, the decoding of the fourth luminance block 20d is enabled.

When the size of the color difference block is larger than the size of the luminance block, neighboring pixels necessary of prediction processing of the color difference block 20e exist before the decoding of the four luminance blocks 20a, 20b, 20c, and 20d for both of a luminance pixel and a color difference pixel, and a correlation degree between neighboring pixels of a luminance signal and neighboring pixels of a color difference signal can be calculated in step S1901 of FIG. 19 without waiting for the decoding of the four luminance blocks 20a, 20b, 20c, and 20d.

Next, after the completion of the decoding of the first luminance block 20a, downsampling of a luminance signal is executed in step S1902 of FIG. 19. Without waiting for the decoding completion of the second luminance block 20b, it is possible to predict pixels of the color difference block 20e that correspond to the position of the first luminance block 20a. Similarly, after the decoding completion of the second luminance block 20b, downsampling of a luminance signal is executed, and without waiting for the decoding completion of the third luminance block 20c, pixels of the color difference block 20e that correspond to the position of the second luminance block 20b are predicted. Furthermore, after the decoding completion of the third luminance block 20c, downsampling of a luminance signal is executed, and without waiting for the decoding completion of the fourth luminance block 20d, pixels of the color difference block 20e that correspond to the position of the third luminance block 20c are predicted. Lastly, after the decoding completion of the fourth luminance block 20d, downsampling of a luminance signal is executed, and pixels of the color difference block 20e that correspond to the position of the fourth luminance block 20d are predicted.

Figure 21A:
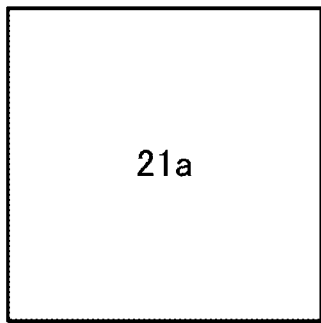
FIGS. 21A and 21B are a diagram illustrating a case where a size of a color difference block is smaller than a size of a luminance block.
Figure 21B:
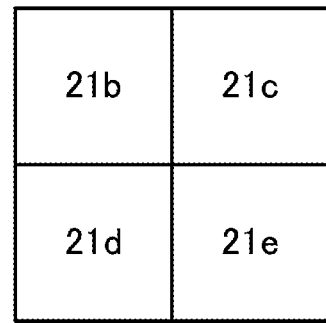

FIGS. 21(a) and 21(b) are diagrams illustrating luminance color difference intra prediction in a case where a size of a color difference block is smaller than a size of a luminance block. The number of pixels of a luminance block 21a illustrated in FIG. 21(a) is 16×16, and the number of pixels of first to fourth color difference blocks 21b, 21c, 21d, and 21e divided into four that are illustrated in FIG. 21(b) is 4×4.

In the 4:2:0 format, because an area occupied by a luminance block is ½ of an area occupied by a color difference block, when the number of pixels of the luminance block is 16×16 and the number of pixels of the color difference block is 4×4, the size of the color difference block is smaller. For performing the comparison between sizes of a luminance block and a color difference block, not by the comparison between areas of the blocks but by the comparisons between the numbers of pixels in the blocks, in the case of the 4:2:0 format, the numbers of pixels in height and width of the color difference block are doubled and converted into the numbers of pixels in height and width of the luminance block. In the 4:2:0 format, when the size of the luminance block is 16×16 and the size of the color difference block is 4×4, the converted size of the color difference block that has been converted into the number of pixels of the luminance block is 8×8, and it can be seen that the size of the color difference block is smaller.

When the size of the color difference block is smaller than the size of the luminance block, neighboring pixels of the first color difference block 21b can be used before the decoding of the luminance block 21a both for the luminance pixel and the color difference pixel, but neighboring pixels of the second to fourth color difference blocks 21c, 21d, and 21e cannot be used unless the decoding of the luminance block 21a is completed. More specifically, unless the decoding of the luminance block 21a is completed and the decoding of the first color difference block 21b is completed, a correlation degree between neighboring pixels of the luminance signal and neighboring pixels of the color difference signal cannot be calculated in step S1901 of FIG. 19 for the second color difference block 21c. Similarly, as for the third color difference block 21d, unless the decoding of the luminance block 21a is completed and the decoding of the first and second color difference blocks 21b and 21c is completed, a correlation degree between neighboring pixels of the luminance signal and neighboring pixels of the color difference signal cannot be calculated for the third color difference block 21d. Similarly, as for fourth color difference block 21e, unless the decoding of the luminance block 21a is completed and the decoding of the first to third color difference blocks 21b, 21c, and 21d is completed, a correlation degree between neighboring pixels of the luminance signal and neighboring pixels of the color difference signal cannot be calculated for the fourth color difference block 21e.

In this manner, when the size of the color difference block is smaller than the size of the luminance block, if luminance color difference intra prediction is performed, in the prediction processing of a color difference block, dependence relationship of processing is generated between the luminance block and the color difference block and between color difference blocks, which is not suitable for parallel processing. Thus, when a size of a color difference block is smaller than a size of a luminance block, luminance color difference intra prediction is restricted. As methods of restricting luminance color difference intra prediction, there are (1) a method of restricting using a syntax, (2) a method of replacing an intra color difference mode, and (3) a method of replacing neighboring pixels.

FIG. 22 illustrates an example of a syntax of an intra color difference prediction mode. When the number of the color difference prediction mode is 0, the same intra prediction mode as the luminance prediction mode is used as a color difference prediction mode. For example, when a luminance prediction mode is a horizontal prediction mode, a color difference prediction mode also becomes a horizontal prediction mode. When the number of the color difference prediction mode is 1, an average value mode (DC mode) is used. The DC mode performs intra prediction using an average value of neighboring pixels. When the number of the color difference prediction mode is 2, a luminance color difference intra prediction mode is used.

As a method of restricting luminance color difference intra prediction, when (1) the luminance color difference intra prediction is restricted using a syntax, because a mode 2 indicates the luminance color difference intra prediction, the mode 2 becomes unselectable. In other words, the mode 2 is not transmitted and the intra color difference mode is selected from the mode 0 and the mode 1.

As a method of restricting luminance color difference intra prediction, when (2) an intra color difference mode is replaced, when the number of the color difference prediction mode is designated as the mode 2, a vertical prediction mode is used in place of a luminance color difference intra prediction mode. Nevertheless, a prediction mode to be replaced with is not limited to the vertical prediction mode and may be another prediction mode. In addition, the luminance prediction mode of the mode 0 and the mode of replacing with the mode 2 become the same, and it is preferable that modes to be used are not redundant.

As a method of restricting luminance color difference intra prediction, when (3) neighboring pixels are replaced, neighboring pixels for calculating a correlation degree between neighboring pixels of a luminance signal and neighboring pixels of a color difference signal in step S1901 of FIG. 19 are replaced. Also in the second to fourth color difference blocks 21c, 21d, and 21e in FIG. 21, it becomes possible to calculate a correlation degree between neighboring pixels without waiting for the decoding of the luminance block 21a.

Figure 23:
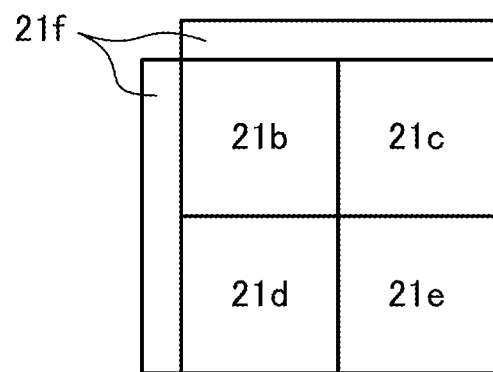
FIG. 23 is a diagram illustrating an example of restricting intra color difference prediction by replacing a neighboring pixel.

FIG. 23 illustrates an example of replacement of neighboring pixels. As neighboring pixels of the left side of the second color difference block 21c, pixels in the first color difference block 21b are normally used, but for using pixels in the first color difference block 21b, it is necessary to wait for the decoding completion of the luminance block 21a and the first color difference block 21b. Thus, a region 21f that can be used without waiting for the decoding completion of the luminance block 21a is used as neighboring pixels of the second color difference block 21c. Similarly, as for the third color difference block 21d, the region 21f that can be used without waiting for the decoding completion of the luminance block 21a is used as neighboring pixels of the third color difference block 21d. Similarly, as for the fourth color difference block 21e, the region 21f that can be used without waiting for the decoding completion of the luminance block 21a is used as neighboring pixels of the fourth color difference block 21e.

In this manner, in the first embodiment, when luminance color difference intra prediction is performed, when the size of the color difference block is smaller than the size of the luminance block, by restricting luminance color difference intra prediction, it becomes possible to ease dependence relationship of processing between the luminance block and the color difference block. This enables parallel processing of the luminance block and the color difference block, and can reduce a processing amount of encoding and decoding.

Second Embodiment

A second embodiment of the present invention will be described. The second embodiment differs from the first embodiment in that the size of the luminance block and the size of the color difference block are individually evaluated and luminance color difference intra prediction is restricted, without using a size relationship between the size of the luminance block and the size of the color difference block, and other configurations and operations are similar to those in the first embodiment.

Figure 24A:
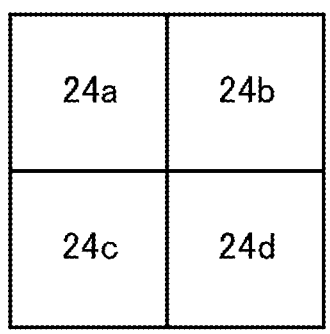
FIGS. 24A, 24B, and 24C are a diagram illustrating luminance color difference intra prediction that is based on a difference in size of a luminance block.
Figure 24B:
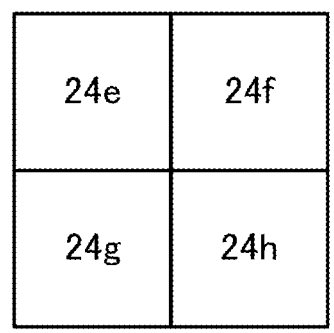
Figure 24C:
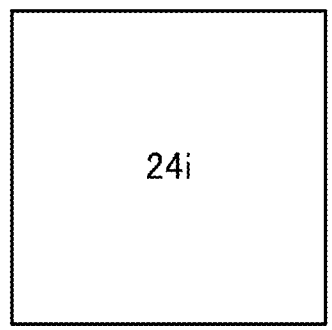

First of all, restriction that is based on the size of the luminance block will be described. FIGS. 24(a) to 24(c) illustrate luminance color difference intra prediction that is based on a difference in size of a luminance block. As illustrated in FIGS. 24(a) and 24(b), a first luminance block 24a corresponds to a position of a first color difference block 24e, a second luminance block 24b corresponds to a position of a second color difference block 24f, a third luminance block 24c corresponds to a position of a third color difference block 24g, and a fourth luminance block 24d corresponds to a position of a fourth color difference block 24h. In addition, a luminance block 24i in FIG. 24(c) corresponds to the positions of the first to fourth color difference blocks 24e, 24f, 24g, and 24h in FIG. 24(b).

A dependence relationship between the luminance block and the color difference block will be described. When the size of the luminance block is small as in FIG. 24(a), if the decoding of the first luminance block 24a is completed, the decoding of the first color difference block 24e is enabled. If the decoding of the second luminance block 24b is completed, the decoding of the second color difference block 24f is enabled. If the decoding of the third luminance block 24c is completed, the decoding of the third color difference block 24g is enabled. If the decoding of the fourth luminance block 24d is completed, the decoding of the fourth color difference block 24h is enabled.

On the other hand, when the size of the luminance block is larger as in FIG. 24(c), unless the decoding of the luminance block 24i is completed, the decoding of all the first to fourth color difference blocks 24e, 24f, 24g, and 24h is not enabled.

In the case of independently deciding the division of the luminance block and the division of the color difference block, if an absolute size of the luminance block is large, a possibility that the size of the color difference block becomes smaller than the size of the luminance block increases. Thus, when an absolute size of the luminance block is larger than or equal to a predetermined size, luminance color difference intra prediction of a corresponding color difference block is restricted.

Similarly, if an absolute size of the color difference block is small, a possibility that the size of the color difference block becomes smaller than the size of the luminance block increases. Thus, when an absolute size of the color difference block is smaller than or equal to a predetermined size, luminance color difference intra prediction of the color difference block is restricted.

A restriction method of luminance color difference intra prediction is similar to that in the first embodiment.

In this manner, in the second embodiment, when an absolute size of the luminance block is larger than a threshold, or when an absolute size of the color difference block is smaller than a threshold, luminance color difference intra prediction is restricted. It becomes possible to stochastically ease dependence relationship of processing between the luminance block and the color difference block, by restricting luminance color difference intra prediction while predicting a case where the size of the color difference block is smaller than the size of the luminance block.

Third Embodiment

A third embodiment of the present invention will be described. The third embodiment is different from the first embodiment in that the block divider 101 divides a color difference block in such a manner that the size of the color difference block does not become smaller than the size of the luminance block, and other configurations and operations are similar to those in the first embodiment. When the block divider 101 divides a color difference block, division that makes the size of the color difference block smaller than the size of a luminance block is prohibited. This prevents the size of the color difference block from becoming smaller than the size of the luminance block in luminance color difference intra prediction, and parallel processing of the luminance block and the color difference block is always enabled.

A bitstream of a picture to be output by a picture encoding device of the above-described embodiments includes a specific data format so that decoding can be performed in accordance with an encoding method used in the embodiment, and a picture decoding device corresponding to the picture encoding device can decode a bitstream having the specific data format.

When a wired or wireless network is used for exchanging bitstream between a picture encoding device and a picture decoding device, a bitstream may be converted into a data format suitable for a transmission mode of a communication path. In this case, a transmission device that converts a bitstream output by the picture encoding device, into encoded data having a data format suitable for a transmission mode of a communication path, and transmits the encoded data to the network, and a receiving device that receives the encoded data from the network, restores the encoded data into a bitstream, and supplies the bitstream to the picture decoding device are provided.

The transmission device includes a memory that buffers the bitstream output by the picture encoding device, a packet processor that packetizes the bitstream, and a transmitter that transmits the packetized encoded data via the network. The receiving device includes a receiver that receives the packetized encoded data via the network, a memory that buffers the received encoded data, and a packet processor that generates a bitstream by performing packet processing of the encoded data and provides the bitstream to the picture decoding device.

In addition, by adding a display that displays a picture decoded by the picture decoding device to a configuration, a display device can be provided. In this case, the display reads a decoded picture signal that is generated by the decoded picture signal superimposer 205 and stored in the decoded picture memory 206, and displays the decoded picture signal on a screen.

In addition, by adding an imager to a configuration and inputting a captured picture to the picture encoding device, an imaging device can be provided. In this case, the imager inputs a captured picture signal to the block divider 101.

The above-described processing related to encoding and decoding can be of course implemented as transmission, accumulation, and receiving devices that use hardware, and can also be implemented by firmware stored in a read-only memory (ROM), a flash memory, or the like, or software of a computer or the like. The firmware program and the software program can also be provided with being recorded on a computer-readable recording medium, provided from a server via a wired or wireless network, and provided as datacasting of ground-based or satellite digital broadcasting.

The present invention has been described above based on the embodiments. These embodiments are examples, and the one skilled in the art understands that various modifications can be made on combinations of constituent elements and processing processes of these, and such modifications are included in the scope of the present invention.

What is claimed is:

1. A picture encoding device that divides a picture into blocks and performs encoding for each of the divided blocks, the picture encoding device comprising:
   a luminance signal block divider structured to divide a luminance signal of the picture into rectangular blocks by recursive division into four in the horizontal and vertical directions, or recursive division into two in the horizontal direction or the vertical direction, and generate a luminance signal block;
   a color difference signal block divider structured to divide a color difference signal of the picture into rectangular blocks by recursive division into four in the horizontal and vertical directions, or recursive division into two in the horizontal direction or the vertical direction, and generate a color difference signal block;
   a luminance signal predictor structured to predict a luminance signal; and
   a color difference signal predictor structured to predict a color difference signal,
   wherein the color difference signal predictor can perform luminance color difference intra prediction of predicting a color difference signal from a decoded luminance signal,
   wherein the luminance signal block and the color difference signal block are divided independent of each other in case of intra prediction, but the luminance color difference intra prediction is restricted if a size of the luminance signal block is greater than or equal to a predetermined size, and
   wherein the luminance signal block and the color difference signal block are divided into similar sized blocks in case of inter prediction.

2. A picture encoding method that divides a picture into blocks and performs encoding for each of the divided blocks, the picture encoding method comprising:
   a luminance signal block division step of dividing a luminance signal of the picture into rectangular blocks by recursive division into four in the horizontal and vertical directions, or recursive division into two in the horizontal direction or the vertical direction, and generate a luminance signal block;
   a color difference signal block division step of dividing a color difference signal of the picture into rectangular blocks by recursive division into four in the horizontal and vertical directions, or recursive division into two in the horizontal direction or the vertical direction, and generate a color difference signal block;
   a luminance signal prediction step of predicting a luminance signal; and
   a color difference signal prediction step of predicting a color difference signal, wherein the color difference signal prediction step can perform luminance color difference intra prediction of predicting a color difference signal from a decoded luminance signal, wherein the luminance signal block and the color difference signal block are divided independent of each other in case of intra prediction, but the luminance color difference intra prediction is restricted if a size of the luminance signal block is greater than or equal to a predetermined size, and wherein the luminance signal block and the color difference signal block are divided into similar sized blocks in case of inter prediction.

3. A non-transitory computer-readable recording medium storing a picture encoding program that divides a picture into blocks and performs encoding for each of the divided blocks, the picture encoding program causing a computer to execute:

a luminance signal block division step of dividing a luminance signal of the picture into rectangular blocks by recursive division into four in the horizontal and vertical directions, or recursive division into two in the horizontal direction or the vertical direction, and generate a luminance signal block;

a color difference signal block division step of dividing a color difference signal of the picture into rectangular blocks by recursive division into four in the horizontal and vertical directions, or recursive division into two in the horizontal direction or the vertical direction, and generate a color difference signal block;

a luminance signal prediction step of predicting a luminance signal; and a color difference signal prediction step of predicting a color difference signal, wherein the color difference signal prediction step can perform luminance color difference intra prediction of predicting a color difference signal from a decoded luminance signal, wherein the luminance signal block and the color difference signal block are divided independent of each other in case of intra prediction, but the luminance color difference intra prediction is restricted if a size of the luminance signal block is greater than or equal to a predetermined size, and wherein the luminance signal block and the color difference signal block are divided into similar sized blocks in case of inter prediction.

4. A picture decoding device that performs decoding for each of blocks into which a picture is divided, the picture decoding device comprising:

a luminance signal block divider structured to divide a luminance signal of the picture into rectangular blocks by recursive division into four in the horizontal and vertical directions, or recursive division into two in the horizontal direction or the vertical direction, and generate a luminance signal block;

a color difference signal block divider structured to divide a color difference signal of the picture into rectangular blocks by recursive division into four in the horizontal and vertical directions, or recursive division into two in the horizontal direction or the vertical direction, and generate a color difference signal block;

a luminance signal predictor structured to predict a luminance signal; and a color difference signal predictor structured to predict a color difference signal, wherein the color difference signal predictor can perform luminance color difference intra prediction of predicting a color difference signal from a decoded luminance signal, wherein the luminance signal block and the color difference signal block are divided independent of each other in case of intra prediction, but the luminance color difference intra prediction is restricted if a size of the luminance signal block is greater than or equal to a predetermined size, and wherein the luminance signal block and the color difference signal block are divided into similar sized blocks in case of inter prediction.

5. A picture decoding method that performs decoding for each of blocks into which a picture is divided, the picture decoding method comprising:

a luminance signal block division step of dividing a luminance signal of the picture into rectangular blocks by recursive division into four in the horizontal and vertical directions, or recursive division into two in the horizontal direction or the vertical direction, and generate a luminance signal block;

a color difference signal block division step of dividing a color difference signal of the picture into rectangular blocks by recursive division into four in the horizontal and vertical directions, or recursive division into two in the horizontal direction or the vertical direction, and generate a color difference signal block;

a luminance signal prediction step of predicting a luminance signal; and a color difference signal prediction step of predicting a color difference signal, wherein the color difference signal prediction step can perform luminance color difference intra prediction of predicting a color difference signal from a decoded luminance signal, wherein the luminance signal block and the color difference signal block are divided independent of each other in case of intra prediction, but the luminance color difference intra prediction is restricted if a size of the luminance signal block is greater than or equal to a predetermined size, and wherein the luminance signal block and the color difference signal block are divided into similar sized blocks in case of inter prediction.

6. A non-transitory computer-readable recording medium storing a picture decoding program that performs decoding for each of blocks into which a picture is divided, the picture decoding program causing a computer to execute:

a luminance signal block division step of dividing a luminance signal of the picture into rectangular blocks by recursive division into four in the horizontal and vertical directions, or recursive division into two in the horizontal direction or the vertical direction, and generate a luminance signal block;

a color difference signal block division step of dividing a color difference signal of the picture into rectangular blocks by recursive division into four in the horizontal and vertical directions, or recursive division into two in the horizontal direction or the vertical direction, and generate a color difference signal block;

a luminance signal prediction step of predicting a luminance signal; and a color difference signal prediction step of predicting a color difference signal, wherein the color difference signal prediction step can perform luminance color difference intra prediction of predicting a color difference signal from a decoded luminance signal, wherein the luminance signal block and the color difference signal block are divided independent of each other in case of intra prediction, but the luminance color difference intra prediction is restricted if a size of the luminance signal block is greater than or equal to a predetermined size, and wherein the luminance signal block and the color difference signal block are divided into similar sized blocks in case of inter prediction.

7. A non-transitory computer-readable recording medium storing a bitstream in which a picture is divided into blocks and encoded for each of the divided blocks, the bitstream comprising information on whether luminance color difference intra prediction is used or not, and the bitstream being encoded by:

a luminance signal block division step of dividing a luminance signal of the picture into rectangular blocks by recursive division into four in the horizontal and vertical directions, or recursive division into two in the horizontal direction or the vertical direction, and generate a luminance signal block;

a color difference signal block division step of dividing a color difference signal of the picture into rectangular blocks by recursive division into four in the horizontal and vertical directions, or recursive division into two in the horizontal direction or the vertical direction, and generate a color difference signal block;

a luminance signal prediction step of predicting a luminance signal; and a color difference signal prediction step of predicting a color difference signal, wherein the color difference signal prediction step can perform luminance color difference intra prediction of predicting a color difference signal from a decoded luminance signal, wherein the luminance signal block and the color difference signal block are divided independent of each other in case of intra prediction, but the luminance color difference intra prediction is restricted if a size of the luminance signal block is greater than or equal to a predetermined size, and wherein the luminance signal block and the color difference signal block are divided into similar sized blocks in case of inter prediction.

8. A method of transmitting a bitstream generated by a picture encoding device, the method comprising:

a luminance signal block division step of dividing a luminance signal of the picture into rectangular blocks by recursive division into four in the horizontal and vertical directions, or recursive division into two in the horizontal direction or the vertical direction, and generate a luminance signal block;

a color difference signal block division step of dividing a color difference signal of the picture into rectangular blocks by recursive division into four in the horizontal and vertical directions, or recursive division into two in the horizontal direction or the vertical direction, and generate a color difference signal block;

a luminance signal prediction step of predicting a luminance signal;

a color difference signal prediction step of predicting a color difference signal;

an encoding step of encoding block division information, and generating a bitstream; and a transmitting step of transmitting the bitstream, wherein the color difference signal prediction step can perform luminance color difference intra prediction of predicting a color difference signal from a decoded luminance signal, wherein the luminance signal block and the color difference signal block are divided independent of each other in case of intra prediction, but the luminance color difference intra prediction is restricted if a size of the luminance signal block is greater than or equal to a predetermined size, and wherein the luminance signal block and the color difference signal block are divided into similar sized blocks in case of inter prediction.

9. A method of storing a bitstream on a computer-readable recording medium, the method comprising:

a luminance signal block division step of dividing a luminance signal of the picture into rectangular blocks by recursive division into four in the horizontal and vertical directions, or recursive division into two in the horizontal direction or the vertical direction, and generate a luminance signal block;

a color difference signal block division step of dividing a color difference signal of the picture into rectangular blocks by recursive division into four in the horizontal and vertical directions, or recursive division into two in the horizontal direction or the vertical direction, and generate a color difference signal block;

a luminance signal prediction step of predicting a luminance signal;

a color difference signal prediction step of predicting a color difference signal;

an encoding step of encoding block division information, and generating a bitstream; and a storing step of storing the bitstream on the computer-readable recording medium, wherein the color difference signal prediction step can perform luminance color difference intra prediction of predicting a color difference signal from a decoded luminance signal, wherein the luminance signal block and the color difference signal block are divided independent of each other in case of intra prediction, but the luminance color difference intra prediction is restricted if a size of the luminance signal block is greater than or equal to a predetermined size, and wherein the luminance signal block and the color difference signal block are divided into similar sized blocks in case of inter prediction.

* * * * *